US009797310B2

United States Patent
Ekanayake et al.

(10) Patent No.: US 9,797,310 B2
(45) Date of Patent: *Oct. 24, 2017

(54) HEAT PIPE TEMPERATURE MANAGEMENT SYSTEM FOR A TURBOMACHINE

(71) Applicant: General Electric Company, Schenectady, NY (US)

(72) Inventors: Sanji Ekanayake, Mableton, GA (US); Joseph Paul Rizzo, Simpsonville, SC (US); Alston Ilford Scipio, Mableton, GA (US); Timothy Tahteh Yang, Greenville, SC (US); Thomas Edward Wickert, Greenville, SC (US)

(73) Assignee: General Electric Company, Schenectady, NY (US)

(*) Notice: Subject to any disclaimer, the term of this patent is extended or adjusted under 35 U.S.C. 154(b) by 314 days.

This patent is subject to a terminal disclaimer.

(21) Appl. No.: 14/676,936

(22) Filed: Apr. 2, 2015

(65) Prior Publication Data

US 2016/0290233 A1   Oct. 6, 2016

(51) Int. Cl.
*F02C 7/141* (2006.01)
*F01D 5/08* (2006.01)
(Continued)

(52) U.S. Cl.
CPC ............. *F02C 7/141* (2013.01); *F01D 5/082* (2013.01); *F01D 5/088* (2013.01); *F01D 5/18* (2013.01);
(Continued)

(58) Field of Classification Search
CPC .. F02C 7/14; F02C 7/141; F02C 7/143; F02C 7/16; F02C 7/224; F02C 6/18;
(Continued)

(56) References Cited

U.S. PATENT DOCUMENTS 3,355,883 A * 12/1967 Beam, Jr. ................ F01D 5/088
165/104.28
3,429,122 A   2/1969 Pravda et al.
(Continued)

FOREIGN PATENT DOCUMENTS

EP   0 584 958 A1   3/1994
EP   0541325 B1    5/1997
(Continued)

OTHER PUBLICATIONS

William G. Anderson et al., Heat Pipe Cooling of Turboshaft Engines, American Society of Mechanical Engineers, 1993, International Gas Turbine and Aeroengine Congress and Exposition in Cincinnati, Ohio.*

(Continued)

*Primary Examiner* — Ehud Gartenberg
*Assistant Examiner* — Stephanie Cheng
(74) *Attorney, Agent, or Firm* — James W. Pemrick; Ernest G. Cusick; Frank A. Landgraff

(57) ABSTRACT

A turbomachine includes a compressor having an inter-stage gap between adjacent rows of rotor blades and stator vanes. A combustor is connected to the compressor, and a turbine is connected to the combustor. An intercooler is operatively connected to the compressor, and includes a first plurality of heat pipes that extend into the inter-stage gap. The first plurality of heat pipes are operatively connected to a first manifold, and the heat pipes and the first manifold are configured to transfer heat from the compressed airflow from the compressor to heat exchangers. A cooling system is operatively connected to the turbine, and includes a second plurality of heat pipes located in the turbine nozzles. The second plurality of heat pipes are operatively connected to a second manifold, and the heat pipes and the second (Continued)

US 9,797,310 B2

Page 2 manifold are configured to transfer heat from the turbine nozzles to the heat exchangers.

20 Claims, 17 Drawing Sheets

(51) Int. Cl.
    *F01D 5/18*     (2006.01)
    *F01D 9/06*     (2006.01)
    *F01D 25/12*     (2006.01)
    *F01K 23/02*     (2006.01)
    *F02C 7/14*     (2006.01)
    *F02C 7/143*     (2006.01)
    *F02C 7/224*     (2006.01)
    *F02C 6/18*     (2006.01)
    *F02C 6/08*     (2006.01)

(52) U.S. Cl.
    CPC ............ *F01D 5/181* (2013.01); *F01D 9/065* (2013.01); *F01D 25/125* (2013.01); *F01K 23/02* (2013.01); *F02C 6/08* (2013.01); *F02C 6/18* (2013.01); *F02C 7/14* (2013.01); *F02C 7/143* (2013.01); *F02C 7/224* (2013.01); *F05D 2260/208* (2013.01); *Y02E 20/16* (2013.01)

(58) Field of Classification Search
    CPC .......... F02C 7/185; Y02E 20/16; F01D 5/046; F01D 25/14; F01D 25/12; F01D 11/14; F01D 11/24; F01D 11/18; F01D 25/125; F01P 2004/2278; F01P 2004/22783; F05D 2260/20; F05B 2260/20; F05B 2260/208
    USPC .................................................. 415/179, 114
    See application file for complete search history.

(56) References Cited

U.S. PATENT DOCUMENTS

| | | | |
|---|---|---|---|
| 3,842,596 A | 10/1974 | Gray | |
| 4,419,044 A * | 12/1983 | Barry | F01D 11/24 415/117 |
| 4,741,153 A | 5/1988 | Hallinger et al. | |
| 5,100,291 A | 3/1992 | Glover | |
| 5,160,096 A | 11/1992 | Perkins et al. | |
| 5,161,365 A * | 11/1992 | Wright | F02C 7/16 60/39.461 |
| 5,178,514 A * | 1/1993 | Damiral | F01D 11/08 415/114 |
| 5,267,608 A * | 12/1993 | Coffinberry | B01J 19/002 165/104.14 |
| 5,722,241 A | 3/1998 | Huber | |
| 6,134,880 A * | 10/2000 | Yoshinaka | F02C 7/143 60/226.1 |
| 6,385,958 B2 | 5/2002 | Leone et al. | |
| 6,393,825 B1 | 5/2002 | Leone et al. | |
| 7,587,887 B2 | 9/2009 | Horiuchi et al. | |
| 8,033,116 B2 | 10/2011 | Sengar et al. | |
| 8,096,747 B2 | 1/2012 | Sengar et al. | |
| 8,112,998 B2 * | 2/2012 | Liu | F02C 7/185 60/728 |
| 8,157,512 B2 | 4/2012 | Zhang et al. | |
| 8,240,975 B1 | 8/2012 | Ryznic | |
| 8,359,824 B2 | 1/2013 | Zhang et al. | |
| 8,397,516 B2 | 3/2013 | Maldonado | |
| 8,596,073 B2 | 12/2013 | Zhang | |
| 8,794,907 B1 | 8/2014 | Brostmeyer et al. | |
| 8,813,503 B2 | 8/2014 | Jones | |
| 8,816,521 B2 | 8/2014 | Kleen et al. | |
| 8,858,161 B1 * | 10/2014 | Ryznic | F02C 7/143 415/1 |
| 2005/0050877 A1 * | 3/2005 | Venkataramani | F02C 7/047 60/39.093 |
| 2007/0017208 A1 * | 1/2007 | Ralls, Jr. | F02C 1/04 60/39.511 |
| 2008/0141954 A1 | 6/2008 | Norris et al. | |
| 2008/0159852 A1 * | 7/2008 | Stephenson | F01D 5/046 415/178 |
| 2008/0310955 A1 * | 12/2008 | Norris | F02C 7/14 415/178 |
| 2010/0054926 A1 | 3/2010 | Zhang et al. | |
| 2010/0236215 A1 * | 9/2010 | Venkataramani | F01D 9/065 60/39.093 |
| 2010/0236217 A1 * | 9/2010 | Venkataramani | F01D 9/06 60/266 |
| 2010/0263388 A1 * | 10/2010 | Norris | F01D 9/065 60/806 |
| 2011/0100020 A1 * | 5/2011 | Zhang | F01D 5/185 60/806 |
| 2011/0103939 A1 * | 5/2011 | Zhang | F01D 11/18 415/173.2 |
| 2012/0017564 A1 | 1/2012 | Dhingra et al. | |
| 2012/0031581 A1 * | 2/2012 | Chillar | F01D 17/085 165/11.1 |
| 2014/0123666 A1 | 5/2014 | Ekanayake et al. | |
| 2014/0126991 A1 | 5/2014 | Ekanayake et al. | |
| 2014/0202155 A1 * | 7/2014 | Ota | F22B 1/006 60/641.15 |
| 2014/0208765 A1 | 7/2014 | Ekanayake et al. | |
| 2014/0311157 A1 * | 10/2014 | Laurello | F02C 6/08 60/782 |
| 2015/0107254 A1 | 4/2015 | Shaffer et al. | |
| 2015/0322865 A1 * | 11/2015 | Scipio | F02C 9/18 60/773 |
| 2016/0281604 A1 * | 9/2016 | Freund | F02C 7/143 |
| 2017/0074164 A1 * | 3/2017 | Uechi | F01K 7/22 |

FOREIGN PATENT DOCUMENTS

| | | |
|---|---|---|
| EP | 0570217 B1 | 10/1997 |
| EP | 1 741 874 A2 | 1/2007 |
| EP | 0911505 B1 | 2/2007 |
| EP | 1 895 123 A2 | 3/2008 |
| EP | 1 895 124 A2 | 3/2008 |
| EP | 2 000 648 A2 | 12/2008 |
| EP | 2 148 045 A1 | 1/2010 |
| EP | 2 159 377 A1 | 3/2010 |
| EP | 2 241 728 A2 | 10/2010 |
| EP | 2587028 A2 | 5/2013 |
| GB | 1 361 047 A | 7/1974 |
| GB | 1 516 041 A | 6/1978 |
| GB | 2 264 539 A | 9/1993 |
| GB | 2474567 A | 4/2011 |
| JP | H07-119489 A | 5/1995 |
| WO | 01/31181 A1 | 5/2001 |

OTHER PUBLICATIONS

Frank Icropera et al., Fundamentals of Heat and Mass Transfer, 2011, John Wiley & Sons, 7th edition.*
Sadik Kakac et al., Heat Exchangers: Selection, Ratinf, and Thermal Design, 2002, CRC Press LIC, second edition, p. 302.*
M.R. Beltran et al, Heat Pipe Applications in Aircraft Propulsion, 1984, AIAA, 1269.*
Robert Camilleri et al., Applying Heat Pipes to a Novel Concept Aero Engine: Part 1—Design of Heat Pipe Heat Exchanger for an Intercooled Aero Engine, Jul. 2011, Aeronautic Journal, DOI: 10.1017/S00019240000D6011.*
M.A. da Cunha Alves, An Insight on Intercooling and Reheat Gas Turbine Cycles, 2001, Proceedings of the Institution of Mechanical Engineers, vol. 215.*
Yiding Cao, "Miniature High-Temperature Rotating Heat Pipes and Their Applications in Gas Turbine Cooling", Frontiers in Heat Pipes (FHP), 1, 023002 (2010), Global Digital Central, ISSN: 2155-658X, USA, https://www.thermalfluidscentral.org/journals/index.php/Heat_Pipes/article/view/102/184.

(56) References Cited

OTHER PUBLICATIONS

Boudreaux, K.J., "Rotor Air Coolers—Mitigate failures with tighter control of water chemistry, better materials," Nalco Power, CCJ ONline, © 2014 CCJ Online, Inc., Published by PSI Media, Inc., Las Vegas, NV, Retrieved from the internet URL: http://www.ccj-online.com/3q-2013/rotor-air-coolers/, on Sep. 29, 2016, pp. 1-5.
International Search Report and Written Opinion issued in connection with related PCT Application No. PCT/US2015/024128 dated Dec. 15, 2015.
International Search Report and Written Opinion issued in connection with related PCT Application No. PCT/US2015/024127 dated Jan. 29, 2016.
Extended European Search Report and Opinion issued in connection with related EP Application No. 16162983.7 dated Aug. 29, 2016.
Extended European Search Report and Opinion issued in connection with corresponding EP Application No. 16163035.5 dated Aug. 29, 2016.
Extended European Search Report and Opinion issued in connection with related EP Application No. 16162810.2 dated Aug. 29, 2016.
Extended European Search Report and Opinion issued in connection with related EP Application No. 16163350.8 dated Aug. 30, 2016.
Extended European Search Report and Opinion issued in connection with related EP Application No. 16163302.9 dated Sep. 2, 2016.
Extended European Search Report and Opinion issued in connection with related EP Application No. 16162095.0 dated Sep. 2, 2016.
Extended European Search Report and Opinion issued in connection with related EP Application No. 16162924.1 dated Sep. 2, 2016.
Non-Final Rejection towards related U.S. Appl. No. 14/676,905 dated Sep. 26, 2016.
Extended European Search Report and Opinion issued in connection with related EP Application No. 16161983.8 dated Oct. 4, 2016.
U.S. Appl. No. 14/676,884, filed Apr. 2, 2015, Ekanayake et al.
U.S. Appl. No. 14/676,889, filed Apr. 2, 2015, Ekanayake et al.
U.S. Appl. No. 14/676,895, filed Apr. 2, 2015, Ekanayake et al.
U.S. Appl. No. 14/676,905, filed Apr. 2, 2015, Ekanayake et al.
U.S. Appl. No. 14/676,917, filed Apr. 2, 2015, Ekanayake et al.
U.S. Appl. No. 15/122,597, filed Aug. 30, 2016, Ekanayake et al.
U.S. Appl. No. 14/676,925, filed Apr. 2, 2015, Ekanayake et al.
U.S. Appl. No. 14/676,950, filed Apr. 2, 2015, Ekanayake et al.

\* cited by examiner

HEAT PIPE TEMPERATURE MANAGEMENT SYSTEM FOR A TURBOMACHINE

CROSS REFERENCE TO RELATED APPLICATIONS

This patent application is related to U.S. application Ser. No. 14/676,884, filed on Apr. 2, 2015; U.S. application Ser. No. 14/676,889, filed on Apr. 2, 2015; U.S. application Ser. No. 14/676,895, filed on Apr. 2, 2015; U.S. application Ser. No. 14/676,905, filed on Apr. 2, 2015; International Application No. PCT/US15/24127, filed on Apr. 2, 2015; International Application No. PCT/US15/24128, filed on Apr. 2, 2015; U.S. application Ser. No. 14/676,917, filed on Apr. 2, 2015; U.S. application Ser. No. 14/676,925, filed on Apr. 2, 2015; and U.S. application Ser. No. 14/676,950, filed on Apr. 2, 2015; all filed concurrently herewith.

BACKGROUND OF THE INVENTION

Exemplary embodiments of the present invention relate to the art of turbomachines and, more particularly, to a heat pipe intercooler for a turbomachine.

Turbomachines include a compressor operatively connected to a turbine that, in turn, drives another machine such as, a generator. The compressor compresses an incoming airflow that is delivered to a combustor to mix with fuel and be ignited to form high temperature, high pressure combustion products. The high temperature, high pressure combustion products are employed to drive the turbine. In some cases, the compressed airflow leaving the compressor is re-compressed to achieve certain combustion efficiencies. However, recompressing the compressed airflow elevates airflow temperature above desired limits. Accordingly, prior to being recompressed, the airflow is passed through an intercooler. The intercooler, which is between two compressor stages, lowers the temperature of the compressed airflow such that, upon recompressing, the temperature of the recompressed airflow is within desired limits. However, conventional intercoolers are large systems requiring considerable infrastructure and capital costs.

Simple and combined cycle gas turbine systems are designed to use a variety of fuels ranging from gas to liquid, at a wide range of temperatures. In some instances, the fuel might be at a relatively low temperature when compared to the compressor discharge air temperature. Utilizing low temperature fuel impacts emissions, performance, and efficiency of the gas turbine system. To improve these characteristics, it is desirable to increase the fuel temperature before combusting the fuel.

By increasing the temperature of the fuel before it is burned, the overall thermal performance of the gas turbine system may be enhanced. Fuel heating generally improves gas turbine system efficiency by reducing the amount of fuel required to achieve the desired firing temperature. One approach to heating the fuel is to use electric heaters or heat derived from a combined cycle process to increase the fuel temperature. However, existing combined cycle fuel heating systems often use steam flow that could otherwise be directed to a steam turbine to increase combined cycle output.

BRIEF DESCRIPTION OF THE INVENTION

In an aspect of the present invention, a turbomachine includes a compressor having an intake portion and an outlet portion. The compressor has a plurality of rotor blades and a plurality of stator vanes, and an inter-stage gap exists between adjacent rows of rotor blades and stator vanes. The compressor compresses air received at the intake portion to form a compressed airflow that exits into the outlet portion. A combustor is operably connected with the compressor, and the combustor receives the compressed airflow. A turbine is operably connected with the combustor, and the turbine receives combustion gas flow from the combustor. The turbine has a plurality of turbine blades, a plurality of wheels, a plurality of nozzles, and a turbine casing forming an outer shell of the turbine. An intercooler is operatively connected to the compressor. The intercooler includes a first plurality of heat pipes that extend into the inter-stage gap of the compressor. The first plurality of heat pipes is operatively connected to a first manifold. The first plurality of heat pipes and the first manifold are configured to transfer heat from the compressed airflow to one or more heat exchangers. A cooling system is operatively connected to the turbine. The cooling system includes a second plurality of heat pipes located in at least a portion of the plurality of turbine nozzles. The second plurality of heat pipes is operatively connected to a second manifold. The second plurality of heat pipes and the second manifold are configured to transfer heat from the plurality of nozzles to the one or more heat exchangers.

In another aspect of the present invention, a temperature management system for a turbomachine is provided. The turbomachine has a compressor that includes an intake portion and an outlet portion. The compressor has a plurality of rotor blades, a plurality of stator vanes, and an inter-stage gap that exists between adjacent rows of the rotor blades and the stator vanes. The compressor compresses air received at the intake portion to form a compressed airflow that exits into the outlet portion. A combustor is operably connected with the compressor. The combustor receives the compressed airflow. A turbine is operably connected with the combustor. The turbine receives combustion gas flow from the combustor. The turbine has a plurality of turbine blades, a plurality of wheels, a plurality of nozzles, and a turbine casing forming an outer shell of the turbine. The temperature management system includes an intercooler operatively connected to the compressor. The intercooler includes a first plurality of heat pipes that extend into the inter-stage gap. The first plurality of heat pipes is operatively connected to a first manifold. The first plurality of heat pipes and the first manifold are configured to transfer heat from the compressed airflow to one or more heat exchangers. The temperature management system also includes a cooling system operatively connected to the turbine. The cooling system includes a second plurality of heat pipes located in at least a portion of the plurality of turbine nozzles. The second plurality of heat pipes is operatively connected to a second manifold. The second plurality of heat pipes and the second manifold are configured to transfer heat from the plurality of nozzles to the one or more heat exchangers.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
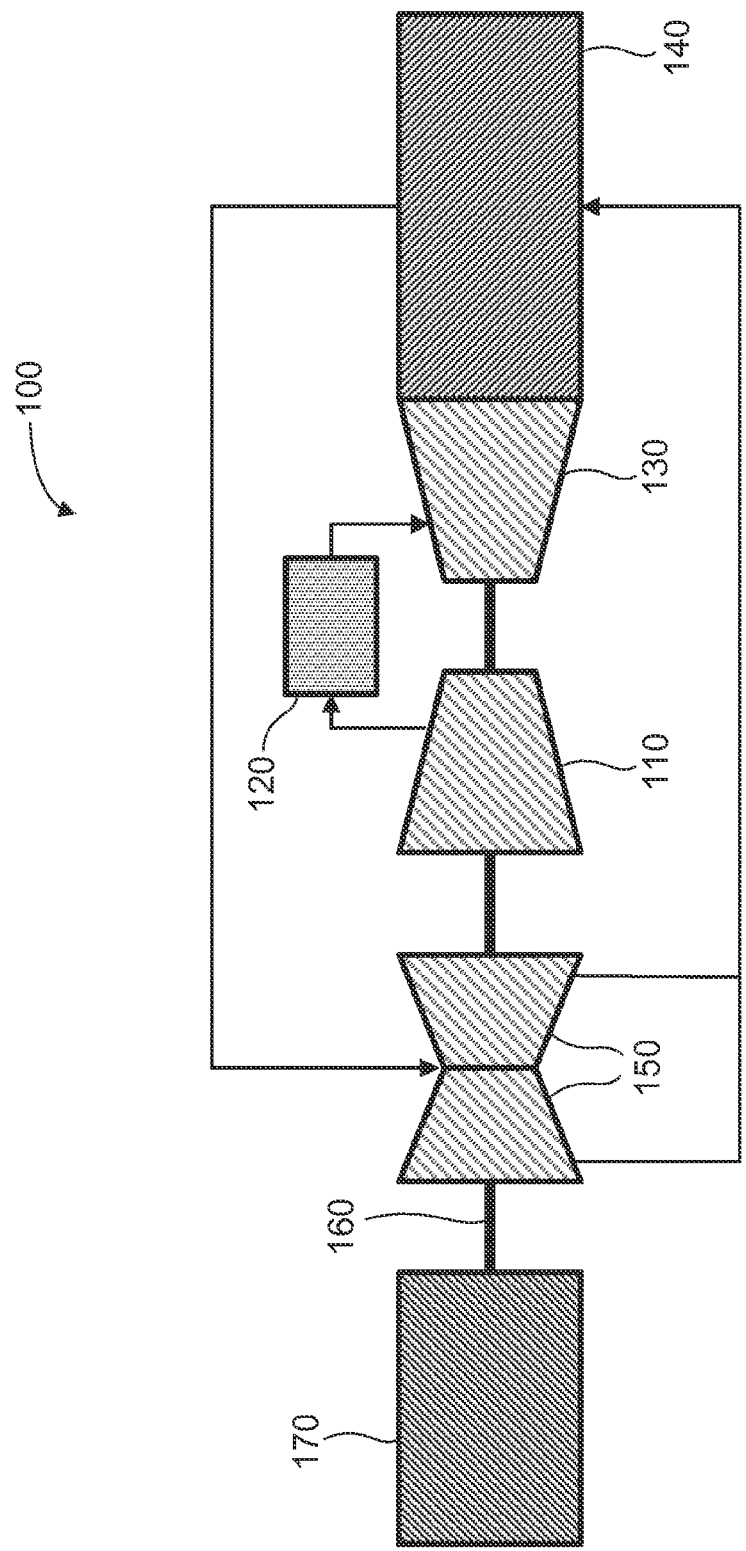
FIG. 1 illustrates a simplified schematic diagram of a turbomachine.

FIG. 1 illustrates a simplified diagram of a turbomachine 100. The turbomachine includes a compressor 110 operably connected to a combustor 120, and the combustor 120 is operably connected to a turbine 130. The turbine's exhaust may be operably connected to a heat recovery steam generator (HRSG) 140. The HRSG 140 generates steam that is directed into a steam turbine 150. In this example, all the turbomachines are arranged in a single shaft configuration, and the shaft 160 drives a generator 170. It is to be understood that the term turbomachine includes compressors, turbines or combinations thereof.

Figure 2:
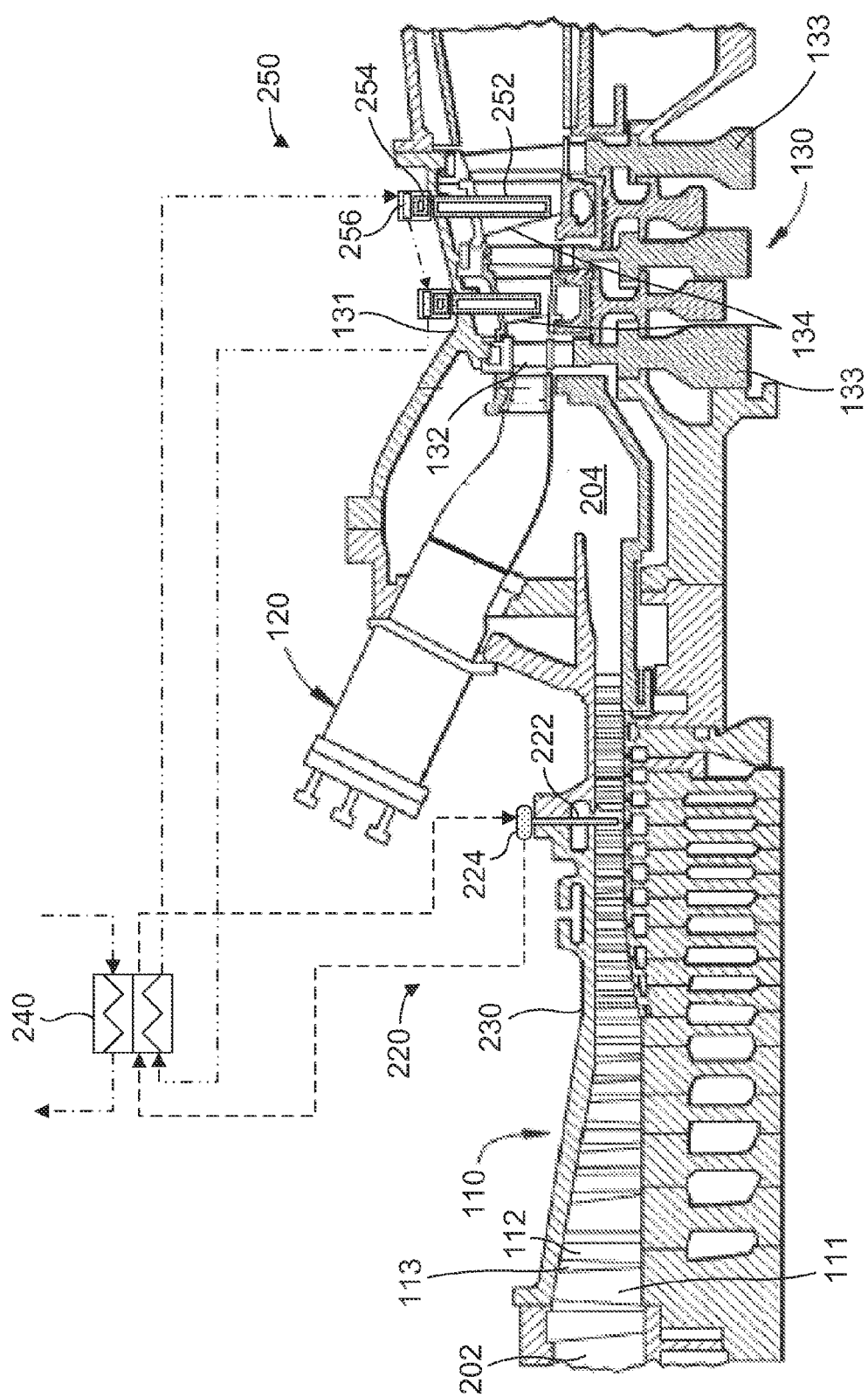
FIG. 2 illustrates a partially schematic, axial sectional view through a portion of the turbomachine, according to an aspect of the present invention.

FIG. 2 is a partially schematic, axial sectional view through a portion of the turbomachine, according to an aspect of the present invention. The turbomachine 100 includes a compressor 110 having an intake portion 202 and an outlet portion 204. The compressor compresses air received at the intake portion 202 and forms a compressed airflow that exits from/into the outlet portion 204. The combustor 120 is operably connected with the compressor 110, and the combustor 120 receives the compressed airflow. The turbine 130 is operably connected with the combustor 120, and the turbine 130 receives combustion gas flow from the combustor 120. The turbine 130 includes a turbine casing 131. The turbine casing 131 forms an outer shell of the turbine 130. The turbine also includes a plurality of buckets 132, turbine wheels 133 and a plurality of nozzles 134.

An intercooler 220 is operatively connected to an inter-stage gap 113 of the compressor 110. The inter-stage gap 113 is a gap between rotor blades 111 and stator vanes 112 in the compressor. The inter-stage gap may be located between any adjacent rotor blades and stator vanes. The intercooler 220 includes a first plurality of heat pipes 222 that extend into the inter-stage gap. For example, the inter-stage gap may be located between the first stage and the last stage, in an air bleed-off stage of the compressor, or at or between any stage(s) as desired in the specific application. The first heat pipes 222 are operatively connected to a first manifold 224, and the heat pipes 222 and manifold 224 are configured to transfer heat from the compressed airflow in the compressor to one or more heat exchangers 240.

The first heat pipes 222 are placed or located in the inter-stage gap, so that the first heat pipes extend from an outer portion of compressor case 230 and into the inter-stage gap. In the example shown, first heat pipes 222 extend into the inter-stage gap corresponding to a 13$^{th}$ stage of the compressor which corresponds to an air bleed-off stage.

However, the first heat pipes could be located at any desired point or stage along compressor 110. Each first heat pipe 222 extends through the turbomachine casing and into the compressed airflow flow path. The first heat pipes 222 absorb heat from the compressed airflow and lower the temperature thereof.

A cooling system 250 is operatively connected to the turbine 130. For example, the cooling system includes a second plurality of heat pipes 252 that are located in at least a portion of the nozzles 134. The heat pipes 252 are in thermal communication with the nozzles and the heat pipes may also be in thermal communication with turbine casing 131. Heat absorbed from the nozzles 134 and subsequently into the heat pipes 252 is transferred to a second group of heat pipes 254, which may be contained within the turbine casing or attached to the turbine casing. The heat from the second plurality of heat pipes is conducted to manifold 256. This heat may then be transferred to the heat pipe heat exchanger 240. The second plurality of heat pipes 252, 254 may be circumferentially located around the turbine and/or located in one or more turbine nozzles.

As the turbine 130 operates, combustion gases generate heat, and some of this heat is transferred to the nozzles 134. This heat may be harvested by the second plurality of heat pipes 252, 254. The heat pipes 252, 254 transfer this heat to the second manifold 256 and subsequently to one or more heat exchangers. As non-limiting examples, the second plurality of heat pipes may be located inside the nozzles 134, or located in the nozzles and within the turbine casing 131. In the latter case, the heat pipes are configured to maintain thermal communication with the turbine casing 131. In other embodiments, the heat pipes 252, 254 may be partially embedded in the turbine casing, or the heat pipes may extend external to the turbine casing. The heat pipes 252, 254 may be located in nozzles between (and including) the first through last stages of the turbine, or in any individual nozzle stage as desired in the specific application.

Figure 3:
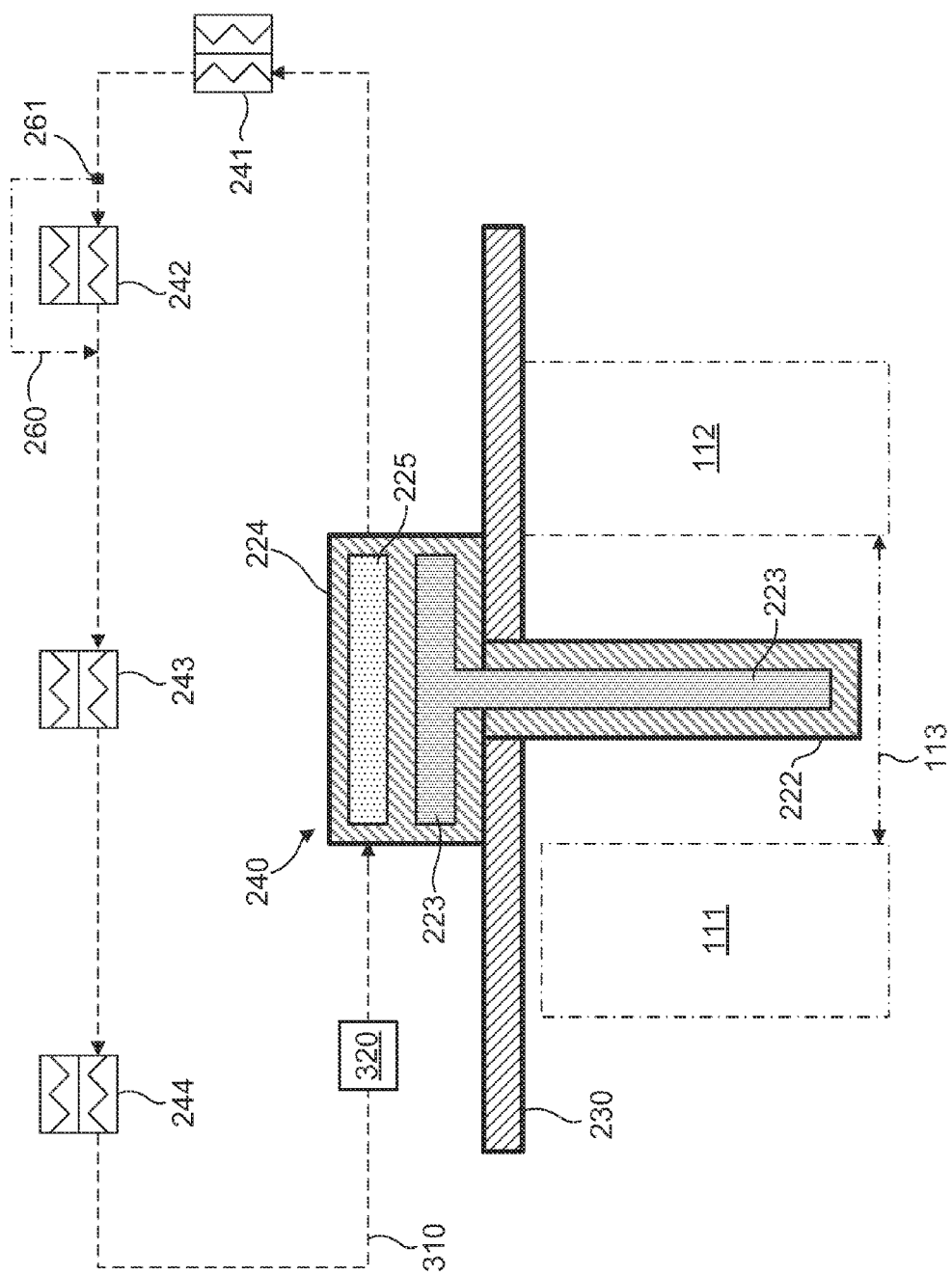
FIG. 3 illustrates a cross-sectional and schematic view of the intercooler, according to an aspect of the present invention.

FIG. 3 illustrates a cross-sectional and schematic view of the intercooler 220, according to an aspect of the present invention. The first heat pipe 222 extends through the compressor's shell 230 or turbomachine shell and into the compressor's airflow. As one example only, the heat pipe 222 is located in inter-stage gap 113, which may be the 13$^{th}$ stage having 13$^{th}$ stage rotor blade 111 and 13$^{th}$ stage stator vane 112. However, it is to be understood that the heat pipes 222 may be located in any gap between blades and vanes or the gap between any stage of the compressor, as desired in the specific application. The heat pipe 222 includes a heat transfer medium 223, such as a liquid metal or molten salt. The manifold 224 includes a coolant/heat transfer medium 225, such as water, glycol or oil. The manifold 224 is thermally connected to a heat pipe heat exchanger 240. A conduit 310 connects the heat pipe heat exchanger 240 to a plurality of other heat exchangers. For example, the other heat exchangers may be a fuel heating heat exchanger 241, a fuel pre-heating heat exchanger 242, a HRSG heat exchanger 243 and any other desired heat exchanger 244. The heat pipe heat exchanger 240 transfers the heat from the manifolds 224 to the heat transfer medium in conduit 310. As examples only, the conduit's heat transfer medium may be water, glycol, oil or any other suitable fluid. A pump 320 may be used to force the fluid through the conduit 310 and the heat exchangers. The heat exchangers may also include valve controlled bypass lines 260 (only one is shown for clarity). A valve 261 can be operated so that it directs flow around the heat exchanger (e.g., 242) via bypass line/conduit 260. This feature may be desirable if specific heat exchangers are to be "removed" (possibly temporarily) from the flow along conduit 310. The valves 261 can be manually controlled or remotely controlled.

Figure 4:
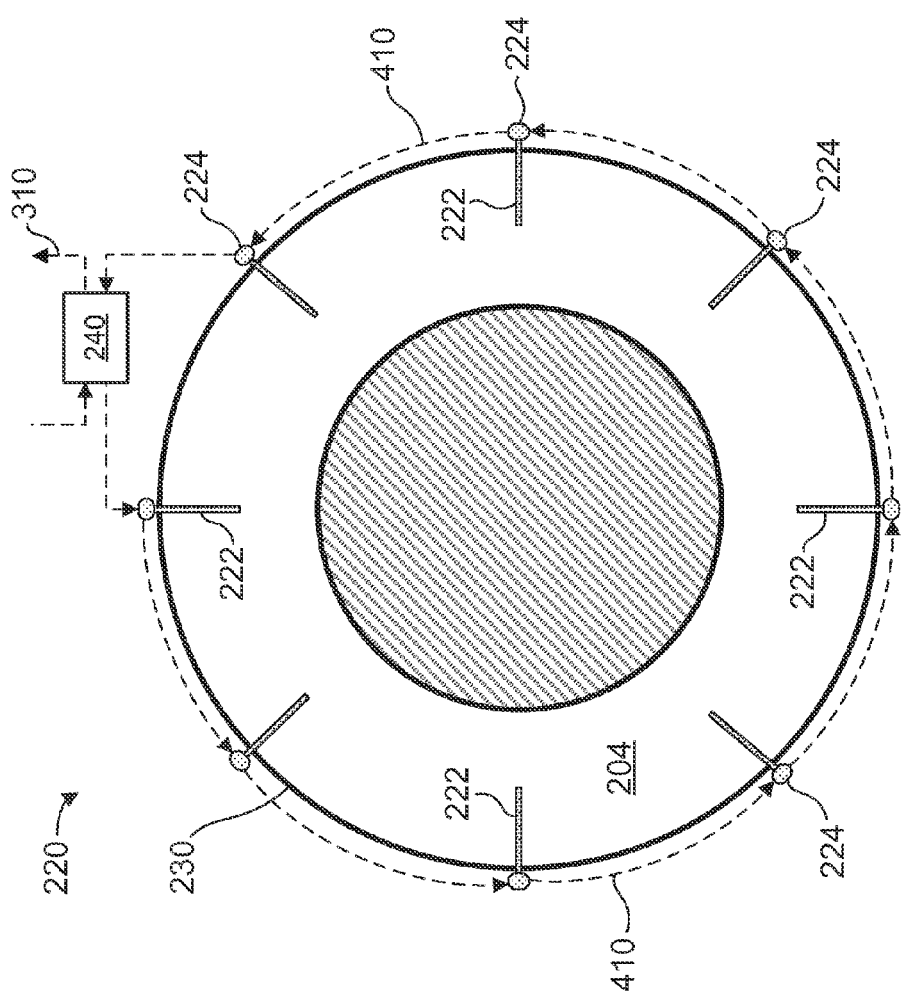
FIG. 4 illustrates a partially schematic and radial cross-sectional view of the intercooler, according to an aspect of the present invention.

FIG. 4 illustrates a partially schematic and radial cross-sectional view of the intercooler 220, according to an aspect of the present invention. The heat pipes 222 are circumferentially located and distributed around the turbomachine 100 or compressor 110. The manifold 224 is connected in a circuit represented by line 410. For example, the manifold 224 would form a generally continuous flow loop around the turbomachine. A portion of this flow loop is interrupted and routed to the heat pipe heat exchanger 240, and the outlet therefrom is routed back the manifold 224. In this way, heat generated by the compressor airflow (via heat pipes 222) can be transferred to the heat exchanger 240.

Figure 5:
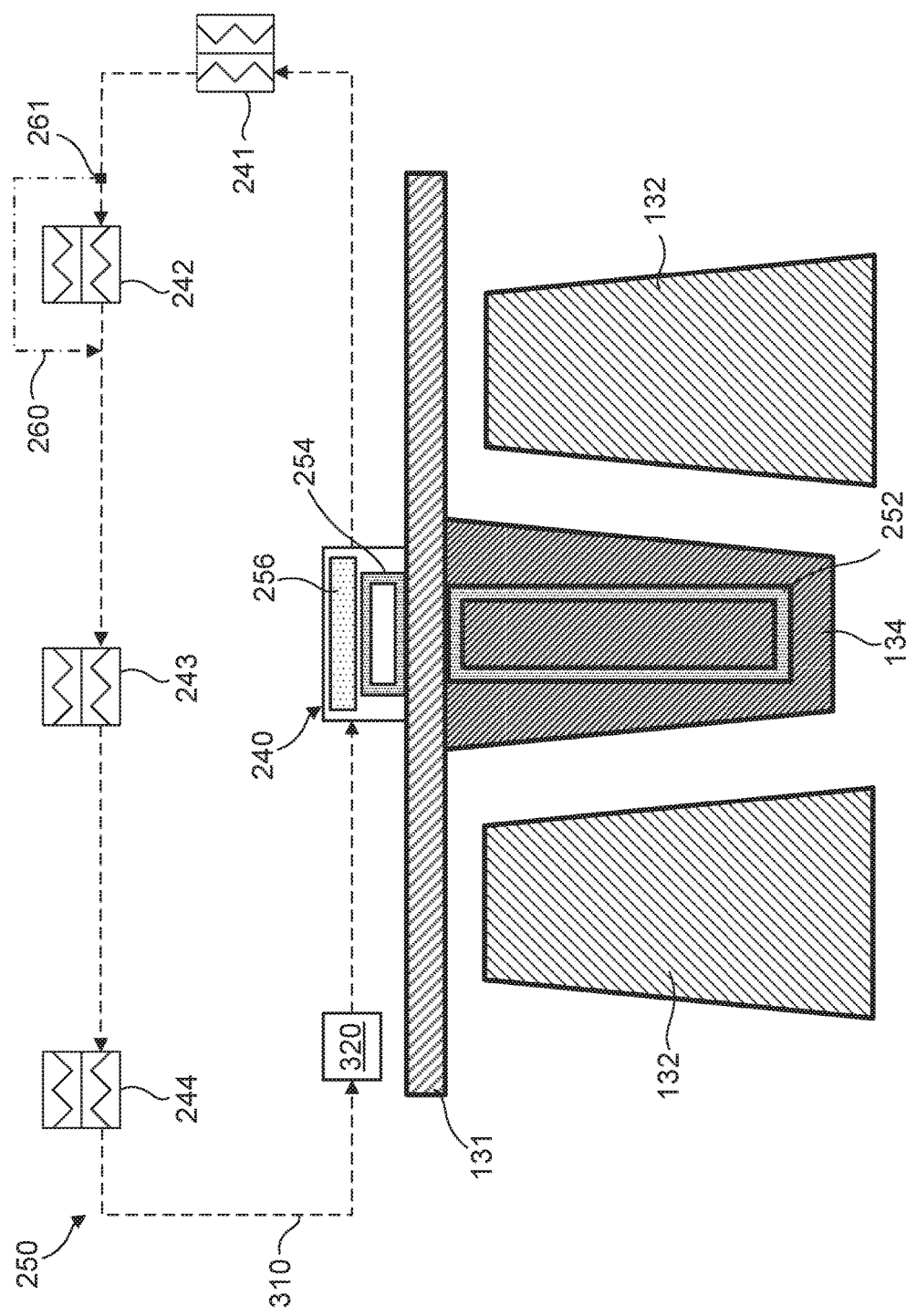
FIG. 5 illustrates a cross-sectional and schematic view of a cooling system, according to another aspect of the present invention.

FIG. 5 illustrates a cross-sectional and schematic view of the cooling system 250, according to an aspect of the present invention. The heat pipe 252 is located in the nozzle 134 and is in thermal communication with heat pipe 254. A plurality of heat pipes 252 (e.g., a first sub-group of heat pipes) are located in a plurality of nozzles, for example there may be one heat pipe in one nozzle. The heat pipes 254 (e.g., a second sub-group of heat pipes) may be contained within the turbine casing or attached to the turbine casing. The manifold 256 is thermally connected to multiple heat pipes 254, and the heat pipes 254 may be arranged circumferentially about the turbine casing/shell 131. The manifold 256 includes a coolant/heat transfer medium, such as water, steam, glycol or oil. The manifold 256 is thermally connected to a heat pipe heat exchanger 240. A conduit 310 connects the heat pipe heat exchanger 240 to a plurality of other heat exchangers. For example, the other heat exchangers may be a fuel heating heat exchanger 241, a fuel pre-heating heat exchanger 242, a HRSG heat exchanger 243 and any other desired heat exchanger 244. The heat pipe heat exchanger 240 transfers the heat from the manifold(s) 256 to the heat transfer medium in conduit 310. As examples only, the conduit's heat transfer medium may be water, glycol, oil, steam or any other suitable fluid or gas. A pump 320 may be used to force the fluid through the conduit 310 and the heat exchangers. The heat exchangers may also include valve controlled bypass lines 260 (only one is shown for clarity). A valve 261 can be operated so that it directs flow around the heat exchanger (e.g., 242) via bypass line/conduit 260. This feature may be desirable if specific heat exchangers are to be "removed" (possibly temporarily) from the flow along conduit 310. The valves 261 can be manually controlled or remotely controlled.

Figure 6:
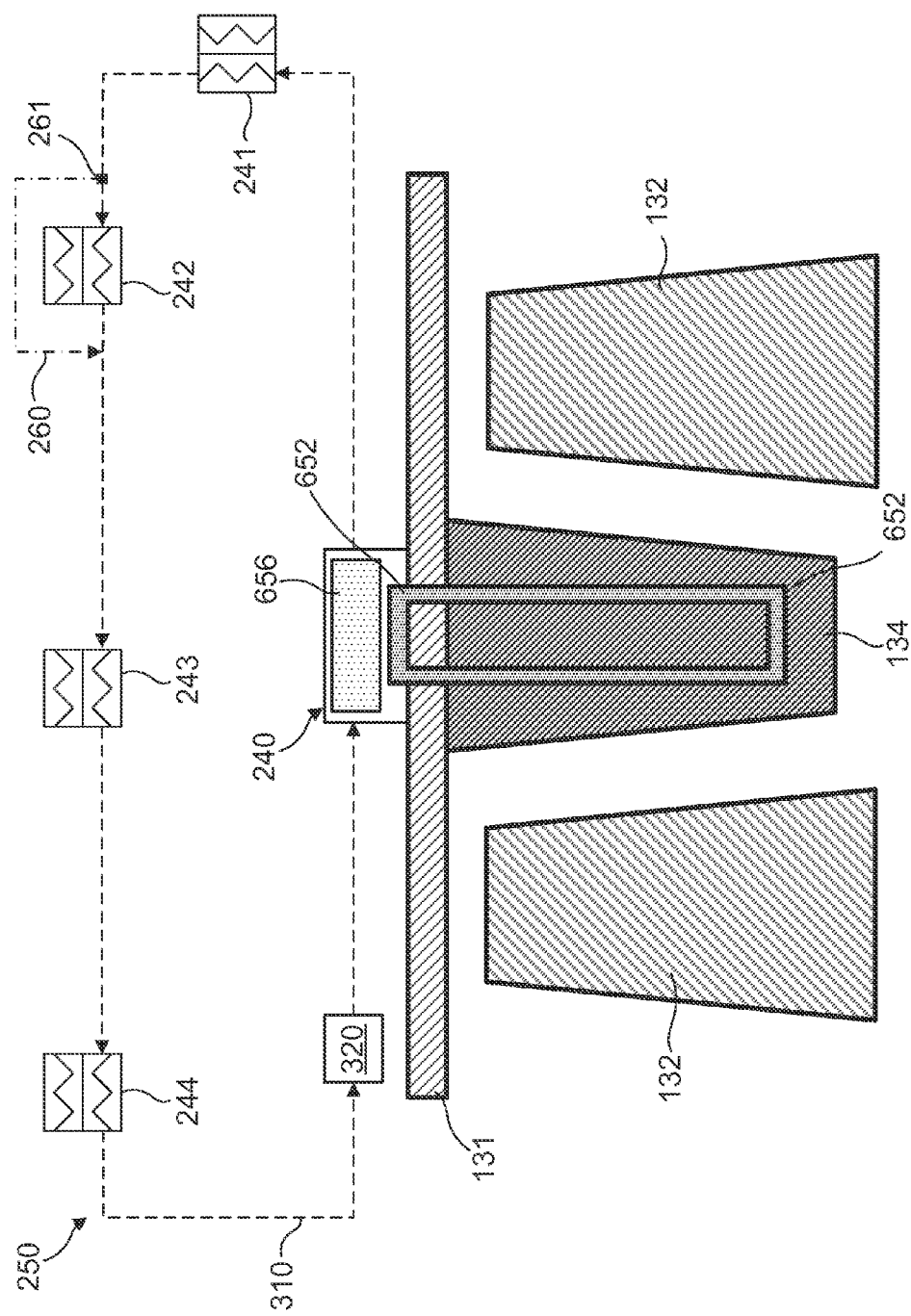
FIG. 6 illustrates a cross-sectional and schematic view of a cooling system, according to another aspect of the present invention.

FIG. 6 illustrates a cross-sectional and schematic view of the cooling system 250, according to another aspect of the present invention. The second plurality of heat pipes 652 are located in the nozzle 134 and extends through the turbine casing 131. The heat pipes 652 are in thermal communication with second manifold 656. The manifold 656 is thermally connected to multiple heat pipes 652, and the manifold 656 may be arranged circumferentially about the turbine casing/shell 131. Heat from the nozzle 134 is transferred from the heat pipes 652 to the manifold 656.

Figure 7:
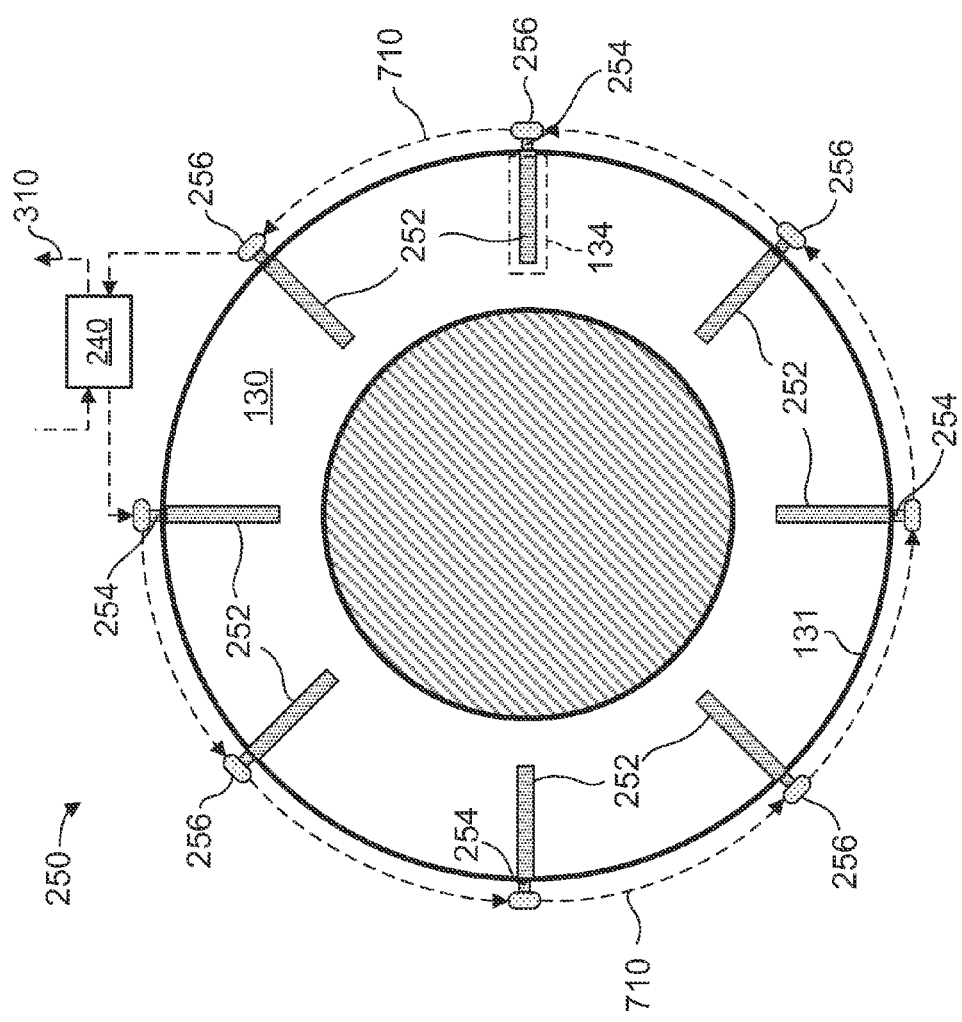
FIG. 7 illustrates a partially schematic and radial cross-sectional view of the cooling system, according to an aspect of the present invention.

FIG. 7 illustrates a partially schematic and radial cross-sectional view of the cooling system 250, according to an aspect of the present invention. The second plurality of heat pipes 252 are located in at least a portion of nozzles 134. The heat pipes 254 are circumferentially located and distributed around the turbine casing 131. The second manifold 256 is connected in a circuit represented by line 710. For example, the second manifold 256 would form a generally continuous flow loop around the turbine 130. A portion of this flow loop is interrupted and routed to the heat pipe heat exchanger 240, and the outlet therefrom is routed back the manifold 256. In this way, heat generated by the nozzles 134 and heat pipes 252, 254 can be transferred or conducted to the heat exchanger 240. The heat pipes 252, 254 or 652 may be referred to as the second plurality of heat pipes.

Figure 10:
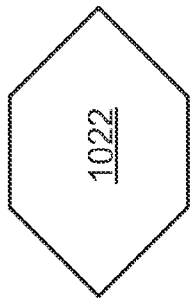
FIG. 10 illustrates a cross sectional shape of a polygonal heat pipe, according to an aspect of the present invention.
Figure 12:
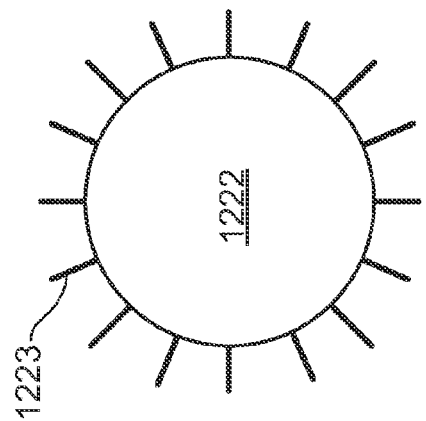
FIG. 12 illustrates a cross sectional shape of a circular or cylindrical heat pipe with a plurality of fins, according to an aspect of the present invention.
Figure 9:
FIG. 9 illustrates a cross sectional shape of an oval heat pipe, according to an aspect of the present invention.
Figure 11:
FIG. 11 illustrates a cross sectional shape of a rectangular with rounded corners heat pipe, according to an aspect of the present invention.
Figure 8:
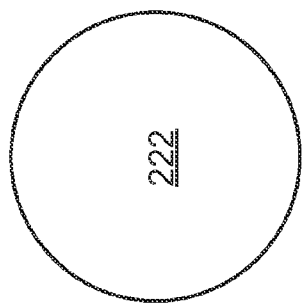
FIG. 8 illustrates a cross sectional shape of a circular or cylindrical heat pipe, according to an aspect of the present invention.

FIGS. 8-12 illustrate various cross sectional shapes for heat pipes, and it is to be understood that these shapes may be applied to all of the heat pipes herein described. FIG. 8 illustrates a cross sectional shape of a circular or cylindrical heat pipe 222, according to an aspect of the present invention. A cylindrical heat pipe is easy to manufacture and install with conventional tools. FIG. 9 illustrates a cross sectional shape of an oval heat pipe 922, according to an aspect of the present invention. The oval heat pipe may have improved heat transfer characteristics compared to the cylindrical heat pipe. FIG. 10 illustrates a cross sectional shape of a polygonal heat pipe 1022, according to an aspect of the present invention. The polygonal shape may include rectangular, hexagonal, square or any other suitable polygonal shape. FIG. 11 illustrates a cross sectional shape of a rectangular with rounded corners heat pipe 1122. The rectangular with rounded corners shape may have improved heat transfer characteristics over the oval heat pipe, due to increased surface area. FIG. 12 illustrates a cross sectional shape of a circular or cylindrical heat pipe 1222 with a plurality of fins 1223, according to an aspect of the present invention. The fins are configured to increase the heat transfer capability of the heat pipe, may be arranged axially as shown or radially, and may be comprised of a material having high thermal conductivity, such as copper or aluminum.

Figure 13:
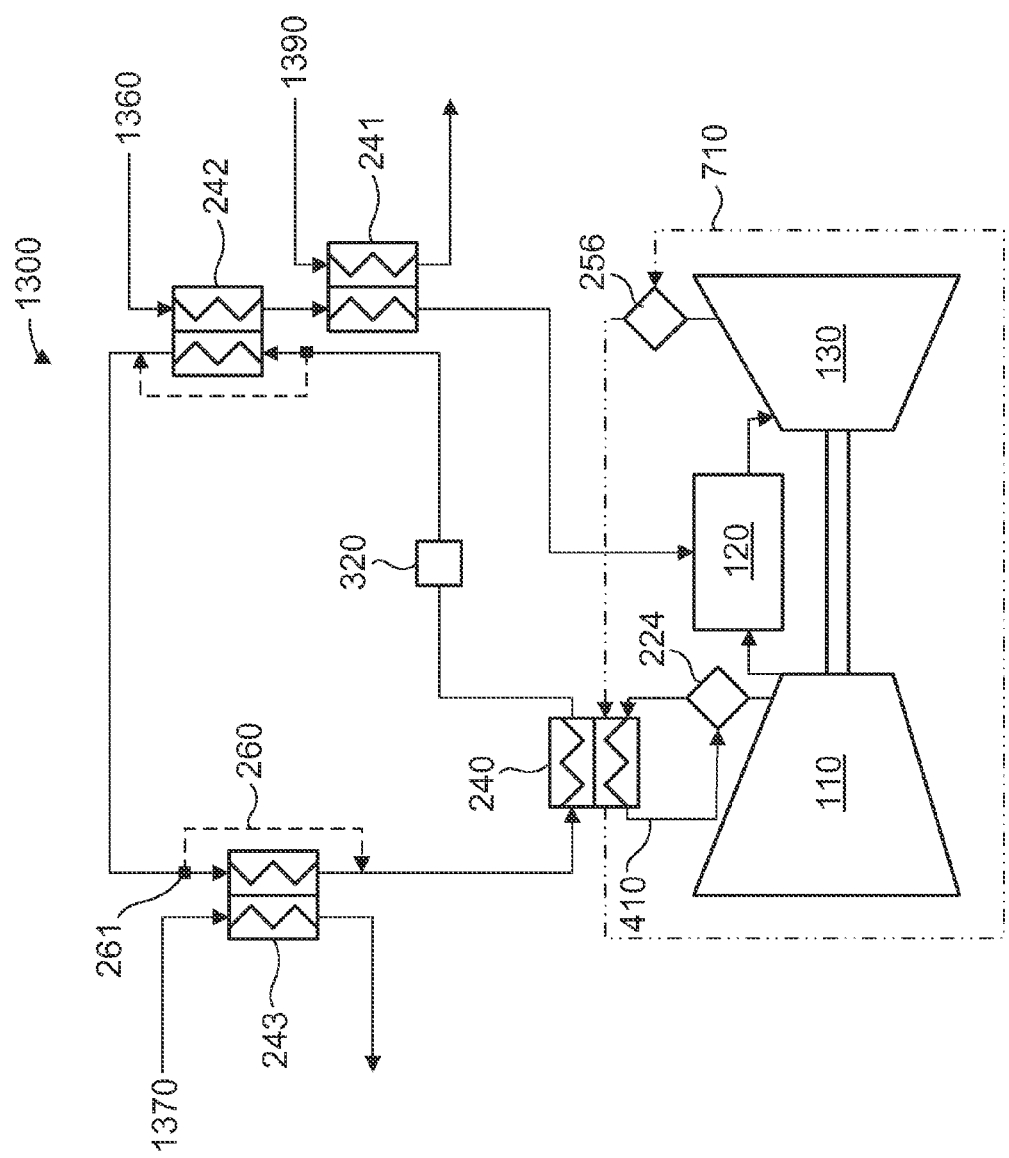
FIG. 13 illustrates a schematic view of a turbomachine incorporating the intercooler and cooling system, according to an aspect of the present invention.

FIG. 13 illustrates a schematic view of a temperature management system 1300 incorporating the intercooler 220 and cooling system 250, according to an aspect of the present invention. The turbomachine includes a compressor 110, combustor 120 and turbine 130. The intercooler includes a plurality of heat pipes (not shown for clarity) connected to a manifold 224. The manifold 224 is connected to a heat pipe heat exchanger 240. The cooling system includes a plurality of heat pipes (not shown for clarity) connected to a manifold 256. The manifold 256 is connected to a heat pipe heat exchanger 240. A pump 320 circulates a coolant through a conduit system and a plurality of heat exchangers. The heat pipe heat exchanger is connected to a fuel/gas pre-heater heat exchanger 242. Fuel gas 1360 is input and travels to the combustor 120. The fuel/gas pre-heater heat exchanger is connected to a heat recovery steam generator (HRSG) heat exchanger 243. Water 1370 is input to the heat exchanger 243 and heated to an elevated temperature or steam, and is output to the HRSG economizer (not shown). Each heat exchanger may include a bypass line 260 and valve 261 to selectively bypass the respective heat exchanger. Only one such bypass line is shown for clarity. A primary fuel heater heat exchanger 241 may be fed by steam 1390 from the HRSG (not shown), and the resultant heated fuel is delivered to combustor 120.

The valves 261 and bypass lines 260 (if connected on all heat exchangers) allow for improved control over fuel heating and machine efficiency. For example, heat exchangers 240 and 243 may be connected in a loop to only heat the water input to the HRSG. Heat exchangers 240 and 242 may be connected in a loop to pre-heat the fuel supply. This configuration may greatly reduce or eliminate the steam withdrawn from the HRSG, and will permit more steam to be directed into a steam turbine (not shown). As another example, heat exchangers 240, 242 and 243 could be connected in a loop. This configuration will pre-heat fuel 1360 and heat water 1370 going into the HRSG. Heat exchangers 240, 242 and 241 may be connected in a loop and this will maximize the fuel heating potential. Alternatively, all heat exchangers may be connected in a loop so that all heat exchangers will benefit from the heat removed from the compressed airflow of the compressor.

Figure 14:
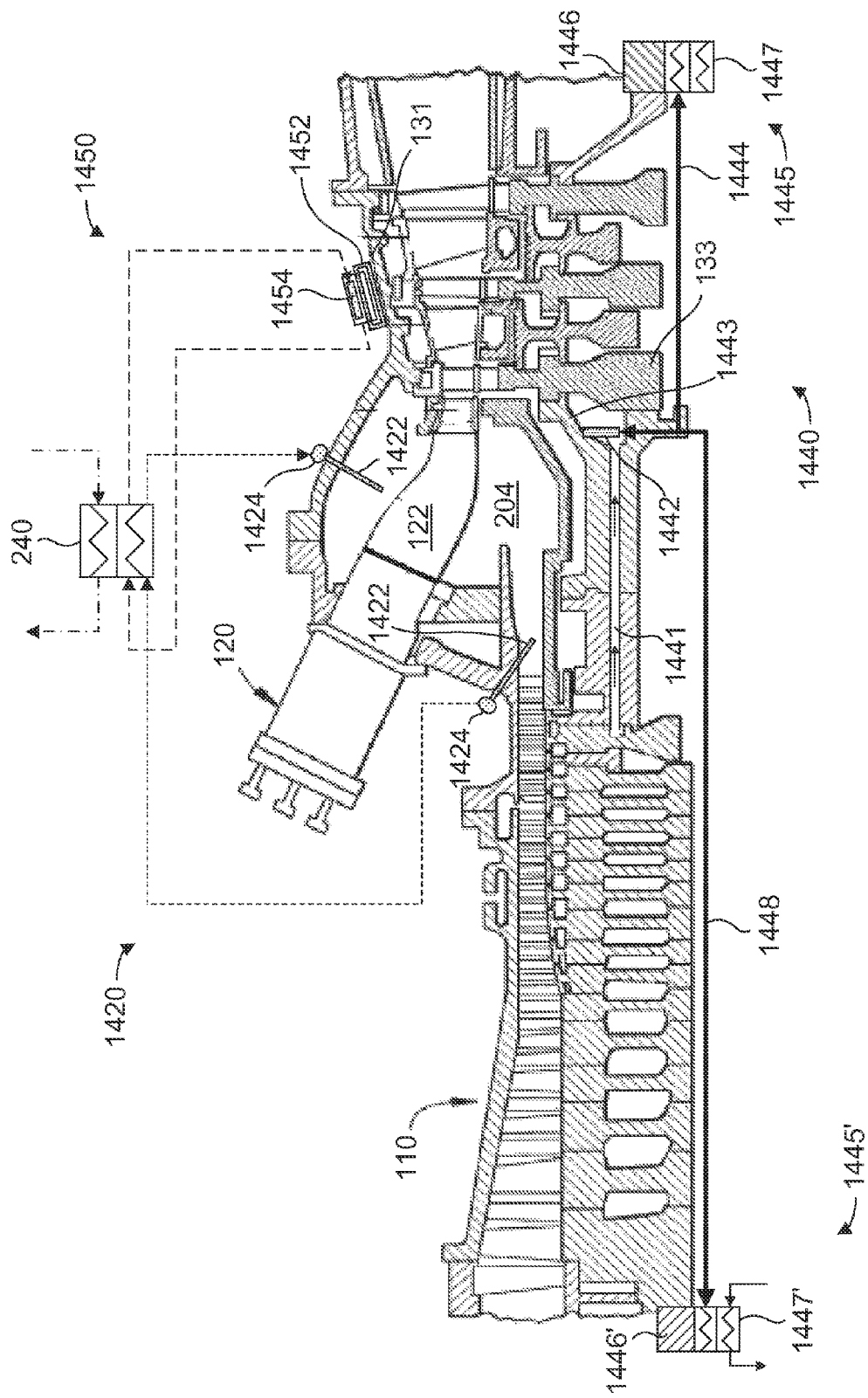
FIG. 14 is a partially schematic, axial sectional view through a portion of the turbomachine, according to an aspect of the present invention.

FIG. 14 is a partially schematic, axial sectional view through a portion of the turbomachine, according to an aspect of the present invention. A second cooling system 1450 is operatively connected to the turbine casing 131. For example, a third plurality of heat pipes 1452 are attached to the turbine casing and the heat pipes are also in thermal communication with the turbine casing. The heat pipes 1452 may be circumferentially located around the turbine casing and attached thereto by welds, fasteners, bolts, welded brackets, clamps or any other suitable attachment mechanism. The third plurality of heat pipes 1452 are operatively connected to a third manifold 1454, and the heat pipes 1452 and manifold 1454 are configured to transfer heat from the turbine casing 131 to one or more heat exchangers 240. The heat pipes 1452 absorb heat from the turbine casing 131. As the turbine 130 operates, hot combustion gases flow through the various turbine stages (three are shown). Some of the heat is transferred to the turbine casing, and this heat may be harvested by the heat pipes 1452. In one example, the heat pipes are welded to the turbine casing, and the heat pipes are configured to maintain close contact with the exterior surface of the turbine casing (to improve heat transfer). In other embodiments, the heat pipes 1452 may be contoured to follow the shape of the turbine casing, or the heat pipes may be embedded into the turbine casing.

An aftercooler 1420 is operatively connected to the outlet portion 204 of the compressor 110. The aftercooler 1420 includes a fourth plurality of heat pipes 1422 that extend into the outlet portion 204. The heat pipes 1422 are operatively connected to a fourth manifold 1424, and the fourth plurality of heat pipes 1422 and fourth manifold 1424 are configured to transfer heat from the compressed airflow in the outlet portion 204 to one or more heat exchangers 240. Some of the heat pipes 1422 are located in the compressor discharge case (CDC) 230 radially inward of the combustor 120, as shown by the heat pipes 1422 located near the outlet of the last stage of the compressor. Each heat pipe 1422 extends through the CDC 230 and into the compressed airflow flow path. The heat pipes 1422 that are located in the compressor outlet portion 204 radially outward from the combustor 120, are shown located near the transition piece 122 and near a compressed airflow inlet of the combustor 120. The radially inward and radially outward heat pipes 1422 may be used alone, or both may be used together. For example, for greater heat removal both sets radially located heat pipes 1422 may be employed. The heat pipes 1422 absorb heat from the compressed air and lower the temperature thereof.

The turbine 130 of a turbomachine utilizes air extracted from the compressor 110 to cool the hot metal components to a temperature that is tolerable to the component base metal properties. The turbine rotating components (e.g., wheels 133 and buckets 132) are cooled via internal passages while the stationary components (e.g., nozzles 134) are cooled via external passages. The rotating components may be cooled by air bled off from the compressor. This compressor bleed off air is routed to the rotating components (e.g., wheels 133) via duct 1441. The bleed off air passes over the wheels 133, thereby cooling the components via convective heat transfer. However, this cooling (or temperature management) process can be improved if the cooling air is reduced in temperature. According to the present invention, a third cooling system 1440 includes a fifth plurality of heat pipes 1442 located axially upstream of at least one of the plurality of wheels 131. As one example, a fifth plurality of heat pipes 1442 may be located or arranged circumferentially around the upstream side of wheel 133. The heat pipes can be affixed to the inside of the rotor barrel cooling chamber 1443. The heat pipes 1442 are operatively connected, via line 1444 to a bearing cooler system 1445. Line 1444 may also be heat pipes. The bearing cooler system 1445 cools bearing 1446 (sometimes referred to as bearing #2) and the lubrication oil associated with the bearing 1446. The heat pipes 1442, 1444 and the bearing cooler system 1445 are configured to transfer heat from the compressor bleed off air (exiting from duct 1441) to one or more heat exchangers 1447.

The fifth plurality of heat pipes 1442 may also be (or alternatively) operatively connected, via lines 1448 to a bearing cooler system 1445'. Lines 1448 may also be heat pipes. The bearing cooler system 1445' cools bearing 1446' (sometimes referred to as bearing #1) and the lubrication oil associated with the bearing 1446'. The heat pipes 1442, 1448 and the bearing cooler system 1445' are configured to transfer heat from the compressor bleed off air (exiting from duct 1441) to one or more heat exchangers 1447'.

Figure 15:
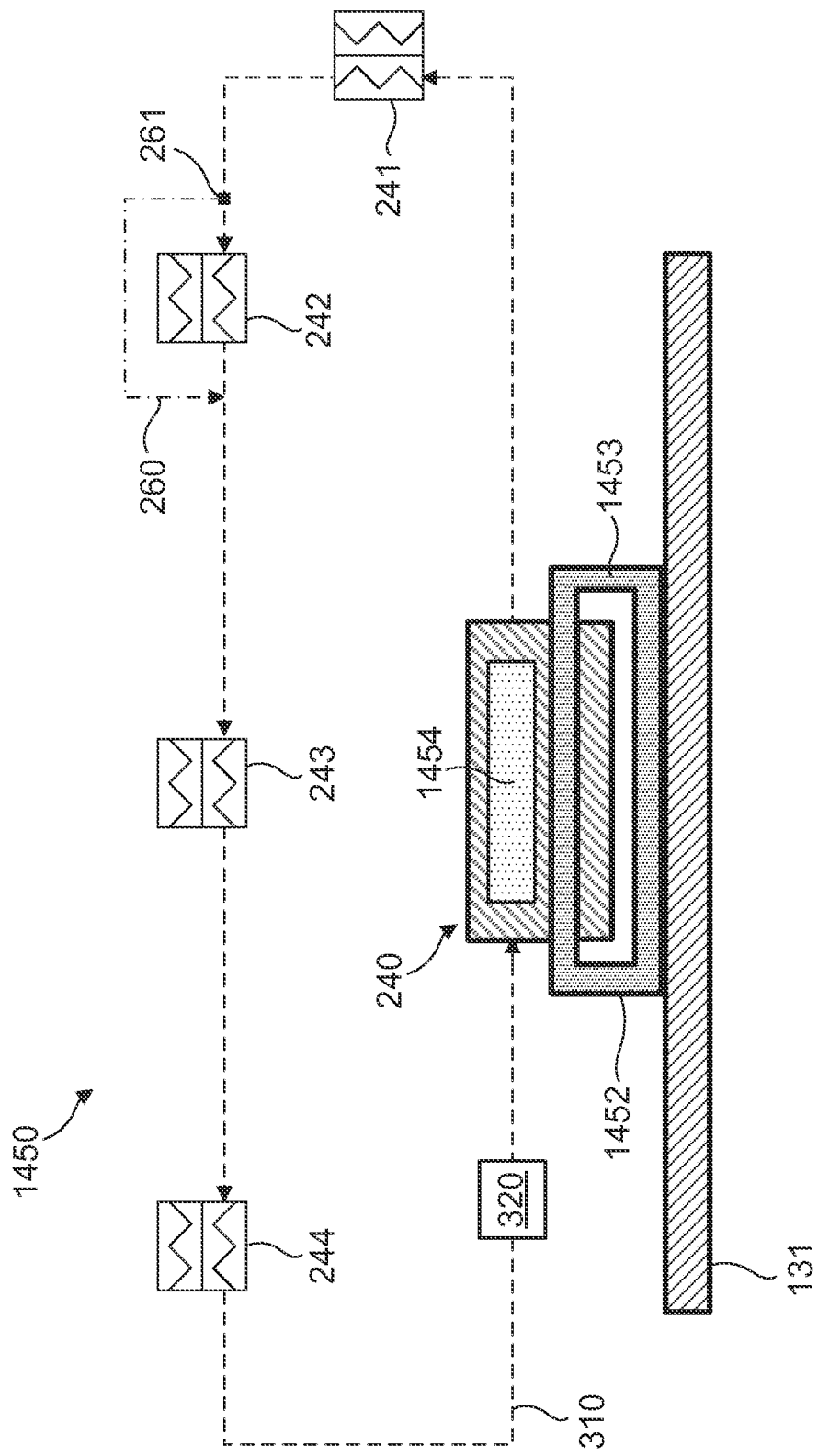
FIG. 15 illustrates a cross-sectional and schematic view of a second cooling system, according to an aspect of the present invention.

FIG. 15 illustrates a cross-sectional and schematic view of the cooling system 1450, according to an aspect of the present invention. The third plurality of heat pipes 1452 are attached to the turbine casing 131. The heat pipe 1452 includes a heat transfer medium 1453, such as a liquid metal or molten salt. The third manifold 1454 includes a coolant/heat transfer medium, such as water, steam, glycol or oil. The manifold 1454 is thermally connected to a heat pipe heat exchanger 240. A conduit 310 connects the heat pipe heat exchanger 240 to a plurality of other heat exchangers. For example, the other heat exchangers may be a fuel heating heat exchanger 241, a fuel pre-heating heat exchanger 242, a HRSG heat exchanger 243 and any other desired heat exchanger 244. The heat pipe heat exchanger 240 transfers the heat from the manifolds 144 to the heat transfer medium in conduit 310.

Figure 16:
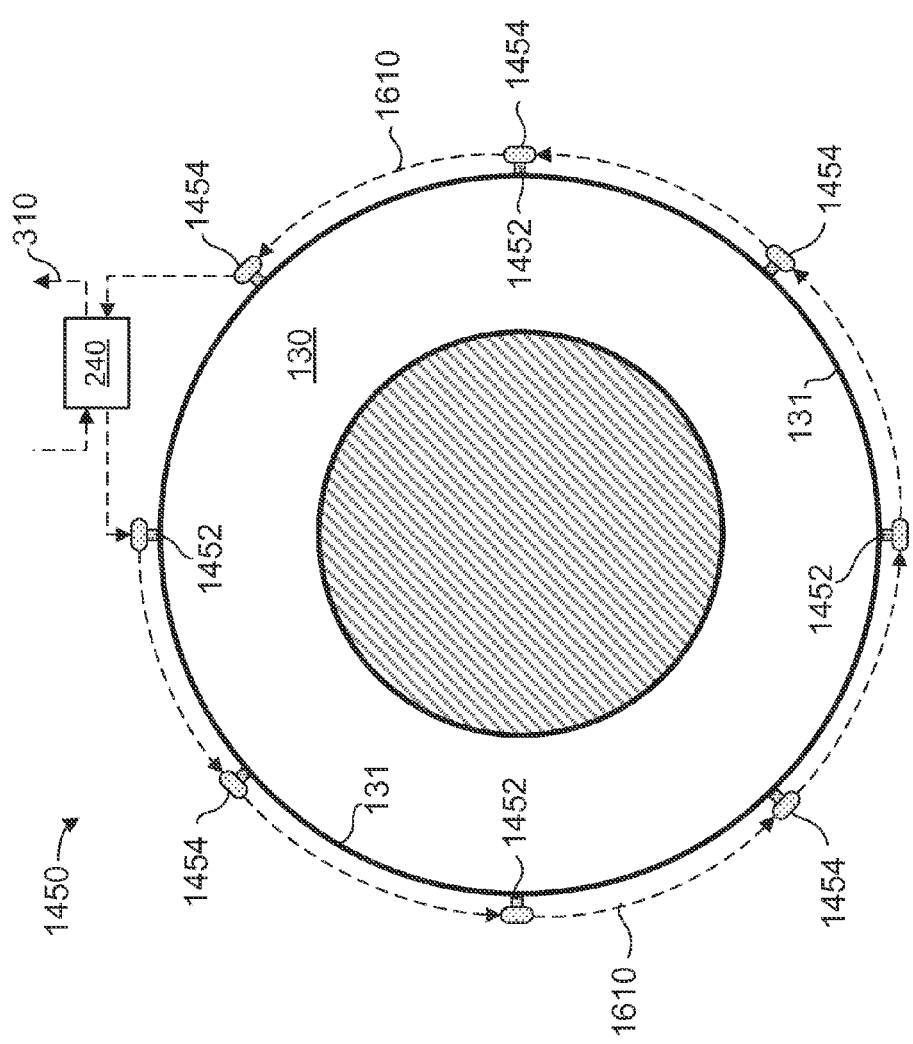
FIG. 16 illustrates a partially schematic and radial cross-sectional view of the second cooling system, according to an aspect of the present invention.

FIG. 16 illustrates a partially schematic and radial cross-sectional view of the second cooling system 1450, according to an aspect of the present invention. The third plurality of heat pipes 1452 are circumferentially located and distributed around the turbine casing 131. The third manifold 1454 is connected in a circuit represented by line 1610. For example, the manifold 1454 would form a generally continuous flow loop around the turbine 130. A portion of this flow loop is interrupted and routed to the heat pipe heat exchanger 240, and the outlet therefrom is routed back the manifold 1454. In this way, heat generated by the turbine casing 131 (via heat pipes 1452) can be transferred to the heat exchanger 240.

Figure 17:
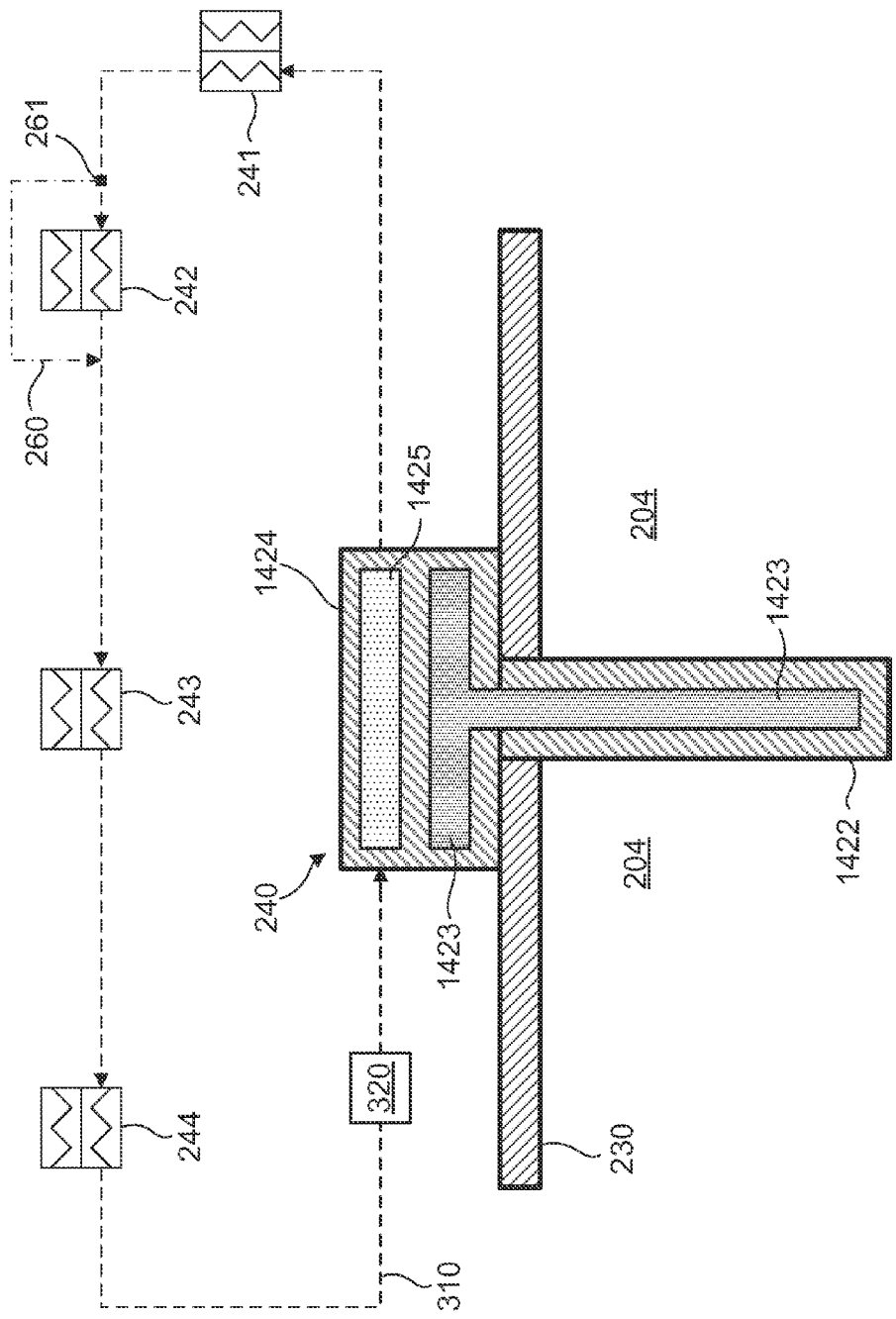
FIG. 17 illustrates a cross-sectional and schematic view of an aftercooler, according to an aspect of the present invention.
Figure 18:
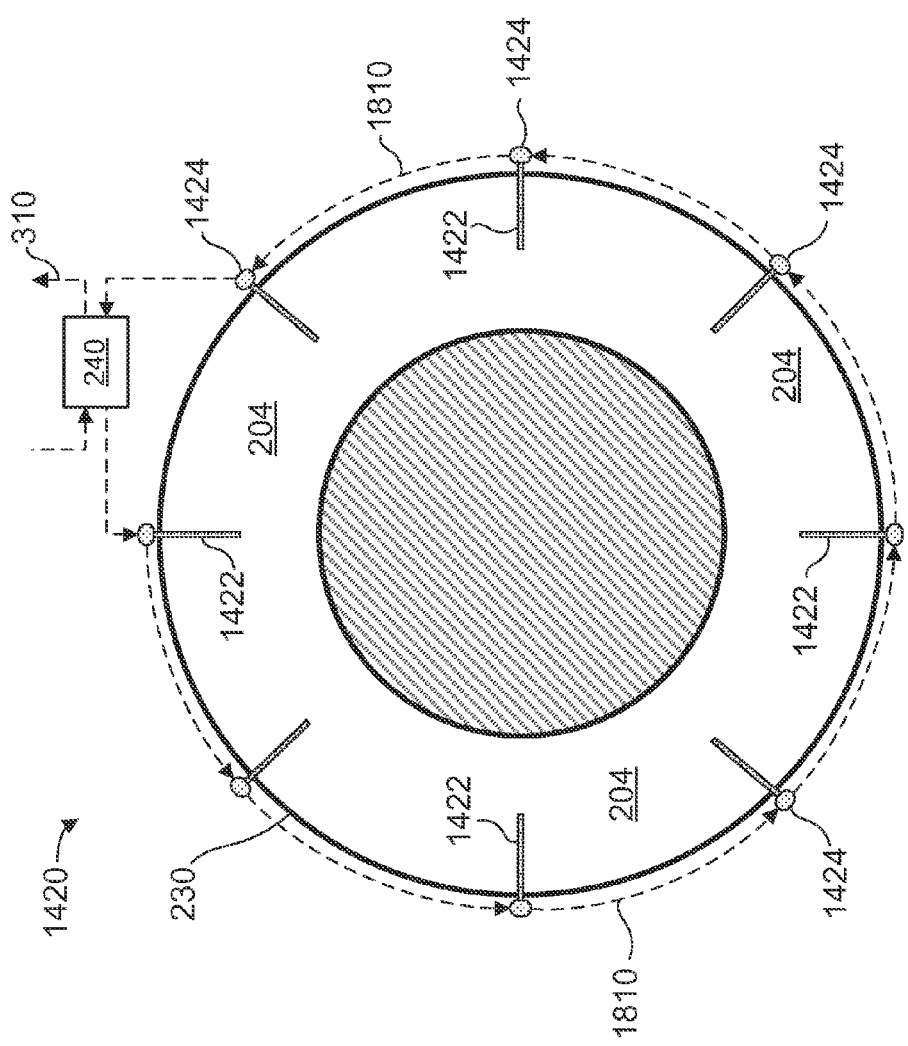
FIG. 18 illustrates a partially schematic and radial cross-sectional view of the aftercooler, according to an aspect of the present invention.

FIG. 17 illustrates a cross-sectional and schematic view of the aftercooler 1420, according to an aspect of the present invention. The fourth plurality of heat pipes 1422 extend through the CDC shell 230 or turbomachine shell and into the compressor's outlet portion 204. The heat pipe 1422 includes a heat transfer medium 1423, such as a liquid metal or molten salt. The fourth manifold 1424 includes a coolant/heat transfer medium 1425, such as water, glycol or oil. The fourth manifold 1424 is thermally connected to a heat pipe heat exchanger 240. A conduit 310 connects the heat pipe heat exchanger 1440 to a plurality of other heat exchangers. For example, the other heat exchangers may be a fuel heating heat exchanger 241, a fuel pre-heating heat exchanger 242, a HRSG heat exchanger 243 and any other desired heat exchanger 244. The heat pipe heat exchanger 240 transfers the heat from the manifold 1424 to the heat transfer medium in conduit 310. FIG. 18 illustrates a partially schematic and radial cross-sectional view of the aftercooler 1420, according to an aspect of the present invention. The heat pipes 1422 are circumferentially located and distributed around the turbomachine 100 or compressor 110. The manifold 1424 is connected in a circuit represented by line 1810. For example, the manifold 1424 would form a generally continuous flow loop around the turbomachine. A portion of this flow loop is interrupted and routed to the heat pipe heat exchanger 240, and the outlet therefrom is routed back the manifold 1424. In this way, heat generated by the compressor airflow (via heat pipes 1422) can be transferred to the heat exchanger 240.

Figure 19:
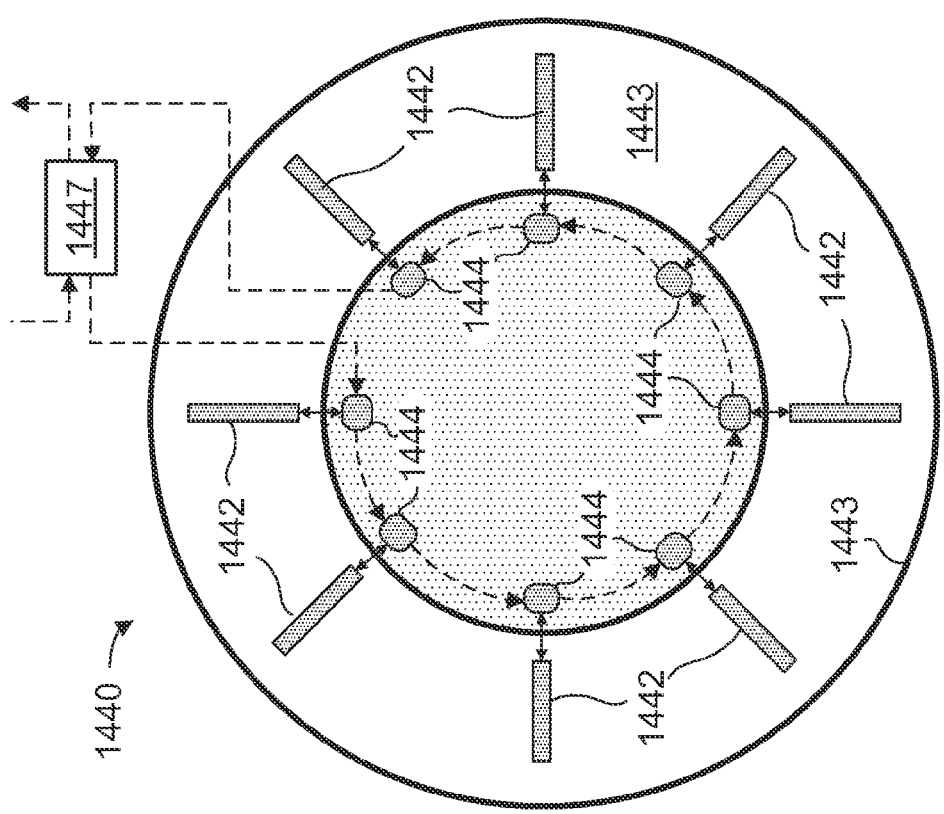
FIG. 19 illustrates a cross-sectional and schematic view of the third cooling system, according to an aspect of the present invention.

FIG. 19 illustrates a cross-sectional and schematic view of the third cooling system 1440, according to an aspect of the present invention. The fifth plurality of heat pipes 1442 are located in the rotor barrel cooling chamber 1443. The heat pipe 1442, which is connected to heat pipes 1444, extends to and is in thermal communication with bearing 1446 and/or heat exchanger 1447. The heat pipes 1442 are arranged circumferentially about the rotor barrel cooling chamber 1443. Heat from the compressor discharge bleed off air is transferred from the heat pipes 1442, 1444 to the bearing 1446 and heat exchanger 1447.

Figure 20:
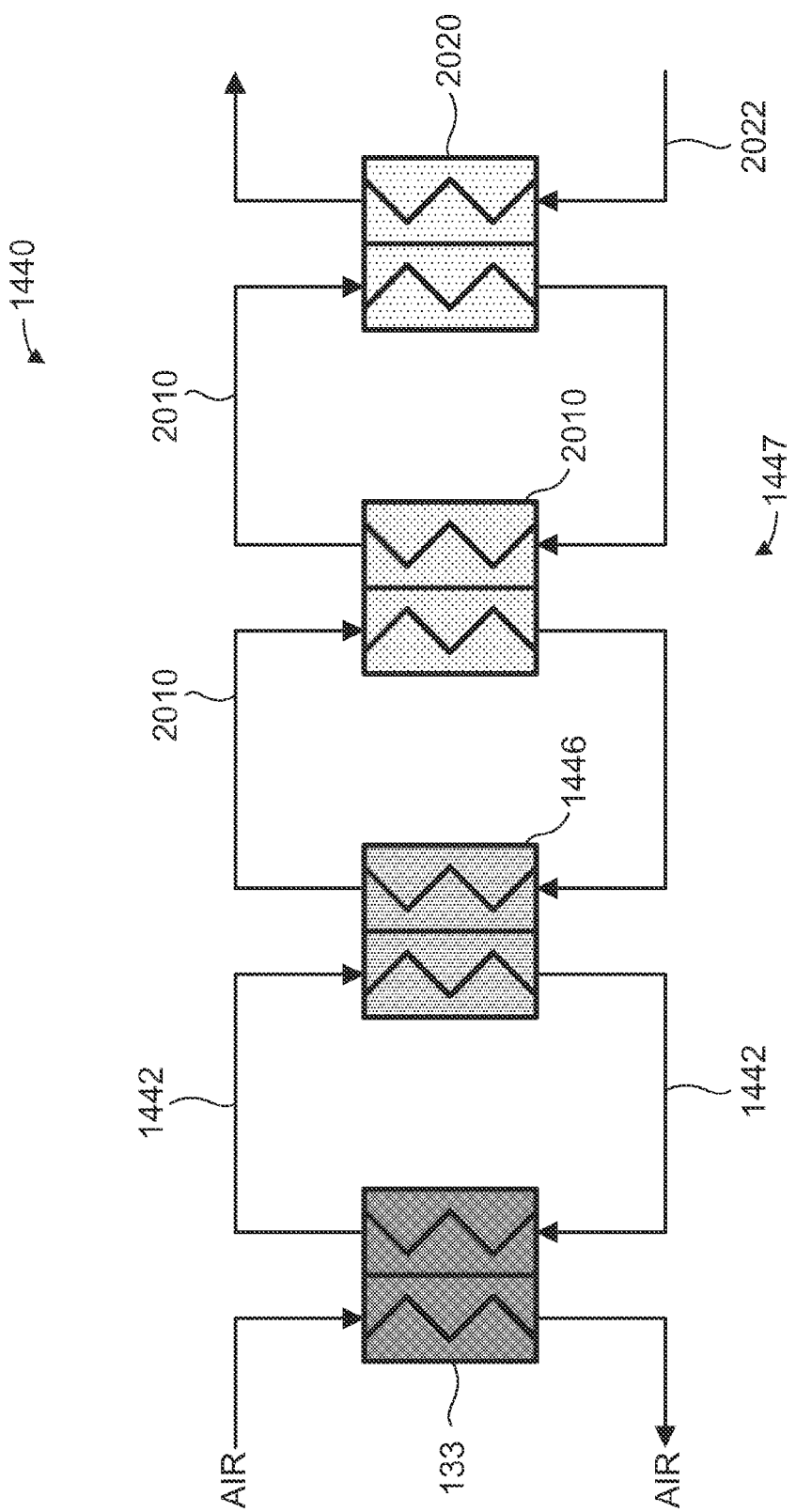
FIG. 20 illustrates a schematic representation of the third cooling system, according to an aspect of the present invention.

FIG. 20 illustrates a schematic representation of third cooling system 1440, according to an aspect of the present invention. The compressor bleed off air exits duct 1441 and impinges on wheel 133. The air may also travel through buckets 132. Heat from the bleed off air is absorbed by heat pipes 1442 and is conducted or transferred to bearing 1446. The bearing lubrication oil 2010 absorbs heat from the bearing and the heat pipes 1442, 1444, and a lubrication oil cooler/heat exchanger 2020 transfers the absorbed heat to a heat transfer medium 2022, such as ambient air or water. Heat exchanger 1447, 1447' may include some or all of bearing 1446, oil 2010 and/or heat exchanger 2020.

Figure 21:
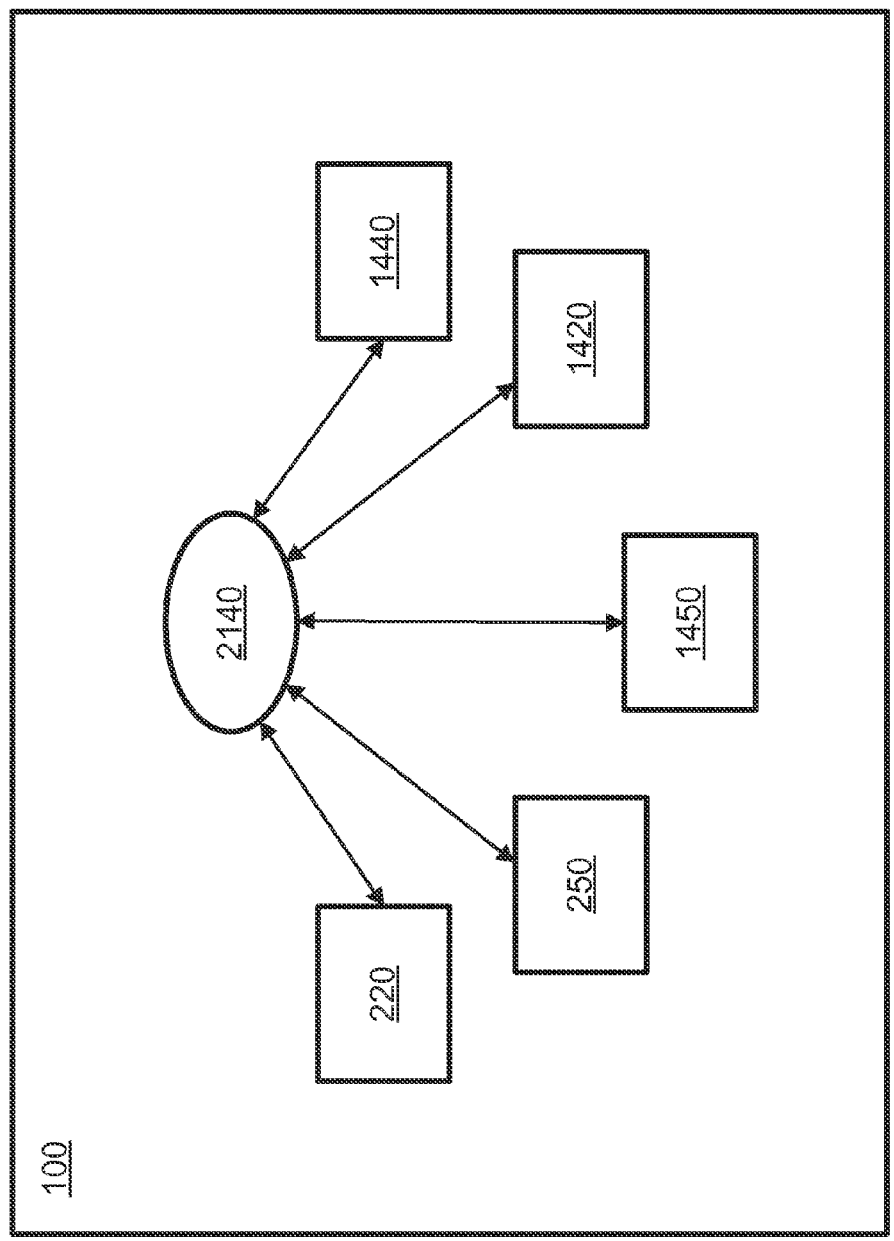
FIG. 21 illustrates a simplified block diagram of the turbomachine incorporating the intercooler, cooling system, second cooling system, aftercooler and third cooling system, according to an aspect of the present invention.

FIG. 21 illustrates a simplified block diagram of the turbomachine 100 incorporating the intercooler 220, cooling system 250, second cooling system 1450, aftercooler 1420 and third cooling system 1440, according to an aspect of the present invention. The intercooler, aftercooler and cooling systems may be connected to heat exchangers 2140, which may be one heat exchanger or more than one heat exchanger. In addition, all or any combination of intercooler, aftercooler and/or cooling systems may be employed in the desired application. As non-limiting examples only, a turbomachine may only employ the intercooler 220 and cooling system 250, or the turbomachine may employ intercooler 220, cooling system 250 and second cooling system 1450, or the turbomachine may employ intercooler 220, cooling system 250, second cooling system 1450, and aftercooler 1420, or the turbomachine may employ intercooler 220, cooling system 250, second cooling system 1450, aftercooler 1420 and third cooling system 1440, or any sub-combination of the intercooler, aftercooler, cooling system, second cooling system and third cooling system.

The manifolds herein described may include a heat transfer medium, such as water, steam, glycol or oil, or any other suitable fluid. Each manifold may be connected to multiple heat pipes, and the heat pipes may be arranged circumferentially about the compressor, the turbine or the turbomachine. The heat pipes include a heat transfer medium which may be a liquid metal, molten salt or Qu material. As examples only, the heat transfer medium may be one or combinations of, aluminum, beryllium, beryllium-fluorine alloy, boron, calcium, cobalt, lead-bismuth alloy, liquid metal, lithium-chlorine alloy, lithium-fluorine alloy, manganese, manganese-chlorine alloy, mercury, molten salt, potassium, potassium-chlorine alloy, potassium-fluorine alloy, potassium-nitrogen-oxygen alloy, rhodium, rubidium-chlorine alloy, rubidium-fluorine alloy, sodium, sodium-chlorine alloy, sodium-fluorine alloy, sodium-boron-fluorine alloy, sodium nitrogen-oxygen alloy, strontium, tin, zirconium-fluorine alloy. As one specific example, the heat transfer medium may be a molten salt comprising potassium and/or sodium. The outer portion of the heat pipes may be made of any suitable material capable of serving the multiple purposes of high thermal conductivity, high strength and high resistance to corrosion from the heat transfer medium.

The heat pipes herein described may also be formed of a "Qu-material" having a very high thermal conductivity. The Qu-material may be in the form of a multi-layer coating provided on the interior surfaces of the heat pipes. For example, a solid state heat transfer medium may be applied to the inner walls in three basic layers. The first two layers are prepared from solutions which are exposed to the inner wall of the heat pipe. Initially the first layer which primarily comprises, in ionic form, various combinations of sodium, beryllium, a metal such as manganese or aluminum, calcium, boron, and a dichromate radical, is absorbed into the inner wall to a depth of 0.008 mm to 0.012 mm. Subsequently, the second layer which primarily comprises, in ionic form, various combinations of cobalt, manganese, beryllium, strontium, rhodium, copper, B-titanium, potassium, boron, calcium, a metal such as aluminum and the dichromate radical, builds on top of the first layer and forms a film having a thickness of 0.008 mm to 0.012 mm over the inner wall of the heat pipe. Finally, the third layer is a powder comprising various combinations of rhodium oxide, potassium dichromate, radium oxide, sodium dichromate, silver dichromate, monocrystalline silicon, beryllium oxide, strontium chromate, boron oxide, B-titanium and a metal dichromate, such as manganese dichromate or aluminum dichromate, which evenly distributes itself across the inner wall. The three layers are applied to the heat pipe and are then heat polarized to form a superconducting heat pipe that transfers thermal energy with little or no net heat loss.

The intercooling, aftercooling and cooling systems of the present invention provide a number of advantages. Compressor and turbine efficiency may be improved and a reduced steam demand for fuel heating results in improved combined cycle heat rate. Compressor mass flow rate may be increased and the reduced steam demand for fuel heating improves combined cycle output. The turbine section buckets, wheels and combustion gas transition pieces may have improved lifespans due to the cooler compressor discharge airflow and lower operating temperatures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A turbomachine comprising:
a compressor including an intake portion and an outlet portion, the compressor having a plurality of rotor blades and a plurality of stator vanes, and an inter-stage gap exists between adjacent rows of rotor blades and stator vanes, the compressor compressing air received at the intake portion to form a compressed airflow that exits into the outlet portion;
a combustor operably connected with the compressor, the combustor receiving the compressed airflow;
a turbine operably connected with the combustor, the turbine receiving combustion gas flow from the combustor, the turbine having a plurality of turbine blades, a plurality of wheels and a plurality of nozzles, and a turbine casing forming an outer shell of the turbine;
an intercooler operatively connected to the compressor, the intercooler including a first plurality of heat pipes that extend into the inter-stage gap, the first plurality of heat pipes operatively connected to a first manifold, the first plurality of heat pipes and the first manifold are configured to transfer heat from the compressed airflow to one or more heat exchangers; and
a cooling system operatively connected to the turbine, the cooling system including a second plurality of heat pipes located in at least a portion of the plurality of nozzles, the second plurality of heat pipes operatively connected to a second manifold, the second plurality of heat pipes and the second manifold are configured to transfer heat from the plurality of nozzles to the one or more heat exchangers.

2. The turbomachine of claim 1, further comprising:
a second cooling system operatively connected to the turbine casing, the second cooling system including a third plurality of heat pipes attached to and in thermal communication with the turbine casing, the third plurality of heat pipes operatively connected to a third manifold, the third plurality of heat pipes and the third manifold are configured to transfer heat from the turbine casing to the one or more heat exchangers.

3. The turbomachine of claim 2, further comprising:
an aftercooler operatively connected to the outlet portion of the compressor, the aftercooler including a fourth plurality of heat pipes that extend into the outlet portion, the fourth plurality of heat pipes operatively connected to a fourth manifold, the fourth plurality of heat pipes and the fourth manifold are configured to transfer heat from the compressed airflow in the outlet portion to the one or more heat exchangers.

4. The turbomachine of claim 3, further comprising:
a third cooling system operatively connected to the turbine, the third cooling system including a fifth plurality of heat pipes located axially upstream of at least one of the plurality of wheels, the fifth plurality of heat pipes operatively connected to a bearing cooler system, the fifth plurality of heat pipes and the bearing cooler system are configured to transfer heat from bleed off air from the compressor to the one or more heat exchangers.

5. The turbomachine of claim 1, the first plurality of heat pipes and the second plurality of heat pipes further comprising a heat transfer medium including one or combinations of:
aluminum, beryllium, beryllium-fluorine alloy, boron, calcium, cesium, cobalt, lead-bismuth alloy, liquid metal, lithium-chlorine alloy, lithium-fluorine alloy, manganese, manganese-chlorine alloy, mercury, molten salt, potassium, potassium-chlorine alloy, potassium-fluorine alloy, potassium-nitrogen-oxygen alloy, rhodium, rubidium-chlorine alloy, rubidium-fluorine alloy, sodium, sodium-chlorine alloy, sodium-fluorine alloy, sodium-boron-fluorine alloy, sodium nitrogen-oxygen alloy, strontium, tin, zirconium-fluorine alloy.

6. The turbomachine of claim 1, the first plurality of heat pipes and the second plurality of heat pipes further comprising a molten salt heat transfer medium including one or combinations of, potassium, sodium or cesium.

7. The turbomachine of claim 1, the first plurality of heat pipes located in the inter-stage gap corresponding to an air bleed-off stage of the compressor.

8. The turbomachine of claim 1, wherein the first plurality of heat pipes and the second plurality of heat pipes have a cross-sectional shape, the cross sectional shape comprising at least one of:
  circular, oval, rectangular with rounded corners or polygonal.

9. The turbomachine of claim 8, at least one of the first plurality of heat pipes or the second plurality of heat pipes further comprising a plurality of fins, the plurality of fins configured to increase the heat transfer capability of the plurality of heat pipes.

10. The turbomachine of claim 1, the one or more heat exchangers including a heat pipe heat exchanger operably connected to at least one of:
  a fuel heating heat exchanger; or
  a heat recovery steam generator heat exchanger; or
  a fuel heating heat exchanger and a heat recovery steam generator heat exchanger.

11. A temperature management system for a turbomachine, the turbomachine having a compressor including an intake portion and an outlet portion, the compressor having a plurality of rotor blades and a plurality of stator vanes, and an inter-stage gap that exists between adjacent rows of rotor blades and stator vanes, the compressor compressing air received at the intake portion to form a compressed airflow that exits into the outlet portion, a combustor operably connected with the compressor, the combustor receiving the compressed airflow, and a turbine operably connected with the combustor, the turbine receiving combustion gas flow from the combustor, the turbine having a plurality of turbine blades, a plurality of wheels and a plurality of nozzles, and a turbine casing forming an outer shell of the turbine, the temperature management system comprising:
  an intercooler operatively connected to the compressor, the intercooler including a first plurality of heat pipes that extend into the inter-stage gap, the first plurality of heat pipes operatively connected to a first manifold, the first plurality of heat pipes and the first manifold are configured to transfer heat from the compressed airflow to one or more heat exchangers; and
  a cooling system operatively connected to the turbine, the cooling system including a second plurality of heat pipes located in at least a portion of the plurality of nozzles, the second plurality of heat pipes operatively connected to a second manifold, the second plurality of heat pipes and the second manifold are configured to transfer heat from the plurality of nozzles to the one or more heat exchangers.

12. The temperature management system of claim 11, further comprising:
  a second cooling system operatively connected to the turbine casing, the second cooling system including a third plurality of heat pipes attached to and in thermal communication with the turbine casing, the third plurality of heat pipes operatively connected to a third manifold, the third plurality of heat pipes and the third manifold are configured to transfer heat from the turbine casing to the one or more heat exchangers.

13. The temperature management system of claim 11, further comprising:
  an aftercooler operatively connected to the outlet portion of the compressor, the aftercooler including a fourth plurality of heat pipes that extend into the outlet portion, the fourth plurality of heat pipes operatively connected to a fourth manifold, the fourth plurality of heat pipes and the fourth manifold are configured to transfer heat from the compressed airflow in the outlet portion to the one or more heat exchangers.

14. The temperature management system of claim 11, further comprising:
  a third cooling system operatively connected to the turbine, the third cooling system including a fifth plurality of heat pipes located axially upstream of at least one of the plurality of wheels, the fifth plurality of heat pipes operatively connected to a bearing cooler system, the fifth plurality of heat pipes and the bearing cooler system are configured to transfer heat from bleed off air from the compressor to the one or more heat exchangers.

15. The temperature management system of claim 11, the first plurality of heat pipes and the second plurality of heat pipes further comprising a heat transfer medium including one or combinations of:
  aluminum, beryllium, beryllium-fluorine alloy, boron, calcium, cesium, cobalt, lead-bismuth alloy, liquid metal, lithium-chlorine alloy, lithium-fluorine alloy, manganese, manganese-chlorine alloy, mercury, molten salt, potassium, potassium-chlorine alloy, potassium-fluorine alloy, potassium-nitrogen-oxygen alloy, rhodium, rubidium-chlorine alloy, rubidium-fluorine alloy, sodium, sodium-chlorine alloy, sodium-fluorine alloy, sodium-boron-fluorine alloy, sodium nitrogen-oxygen alloy, strontium, tin, zirconium-fluorine alloy.

16. The temperature management system of claim 11, the first plurality of heat pipes and the second plurality of heat pipes further comprising a molten salt heat transfer medium including one or combinations of, potassium, sodium or cesium.

17. The temperature management system of claim 11, the first plurality of heat pipes located in the inter-stage gap corresponding to an air bleed-off stage of the compressor.

18. The temperature management system of claim 11, wherein the first plurality of heat pipes and the second plurality of heat pipes have a cross-sectional shape, the cross sectional shape comprising at least one of:
  circular, oval, rectangular with rounded corners or polygonal.

19. The temperature management system of claim 18, at least one of the first plurality of heat pipes or the second plurality of heat pipes further comprising a plurality of fins, the plurality of fins configured to increase the heat transfer capability of the plurality of heat pipes.

20. The temperature management system of claim 11, the one or more heat exchangers including a heat pipe heat exchanger operably connected to at least one of:
  a fuel heating heat exchanger; or
  a heat recovery steam generator heat exchanger; or
  a fuel heating heat exchanger and a heat recovery steam generator heat exchanger.

* * * * *